United States Patent
Kim

(10) Patent No.: US 10,075,905 B2
(45) Date of Patent: Sep. 11, 2018

(54) CELL SEARCH METHOD AND DEVICE IN CELLULAR COMMUNICATION SYSTEM

(71) Applicant: Samsung Electronics Co., Ltd., Gyeonggi-do (KR)

(72) Inventor: Yung-Soo Kim, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/323,935

(22) PCT Filed: Jul. 6, 2015

(86) PCT No.: PCT/KR2015/006959
§ 371 (c)(1),
(2) Date: Jan. 4, 2017

(87) PCT Pub. No.: WO2016/003251
PCT Pub. Date: Jan. 7, 2016

(65) Prior Publication Data
US 2017/0156108 A1     Jun. 1, 2017

(30) Foreign Application Priority Data

Jul. 4, 2014   (KR) .................. 10-2014-0083664

(51) Int. Cl.
| | | |
|---|---|---|
| H04W 48/16 | (2009.01) | |
| H04W 8/22 | (2009.01) | |
| H04W 72/04 | (2009.01) | |
| H04W 72/12 | (2009.01) | |

(52) U.S. Cl.
CPC ............. *H04W 48/16* (2013.01); *H04W 8/22* (2013.01); *H04W 72/0426* (2013.01); *H04W 72/121* (2013.01); *H04W 72/1278* (2013.01)

(58) Field of Classification Search
CPC .. H04B 7/0617; H04B 7/0408; H04B 7/0695; H04W 36/0088; H04W 16/28; H04W 24/10; H04W 40/246; H04W 48/16; H04W 72/0426; H04W 72/1278; H04W 72/121; H04W 8/22
See application file for complete search history.

(56) References Cited

U.S. PATENT DOCUMENTS

| | | |
|---|---|---|
| 6,694,154 B1 | 2/2004 | Molnar et al. |
| 6,768,913 B1 | 7/2004 | Molnar et al. |
| 2008/0043702 A1 | 2/2008 | Moon et al. |
| 2008/0081645 A1 | 4/2008 | Kim et al. |

(Continued)

FOREIGN PATENT DOCUMENTS

KR   10-2013-0019360 A1   2/2013

*Primary Examiner* — Thai Vu

(57) ABSTRACT

The present invention relates to a method and a device for cell searching by a terminal and a base station in a beamforming cellular communication system. According to an embodiment of the present invention, a method for performing cell discovery by a base station of a serving cell in a cellular communication system comprises the steps of receiving information about a beamforming capability of each of all of terminals in a cell, determining whether a cell discovery time needs to be expanded based on the received information about the beamforming capability per terminal, and transmitting group information about the cell discovery to a terminal needing the cell discovery time to be expanded.

40 Claims, 16 Drawing Sheets

(56) References Cited

U.S. PATENT DOCUMENTS

| | | |
|---|---|---|
| 2011/0075610 A1 | 3/2011 | Nakamura |
| 2013/0045690 A1 | 2/2013 | Seol et al. |
| 2013/0237218 A1* | 9/2013 | Li .................... H04W 48/16 |
| | | 455/434 |
| 2014/0024385 A1 | 1/2014 | Kawasaki |
| 2016/0316403 A1* | 10/2016 | Li .................... H04W 24/10 |

* cited by examiner

CELL SEARCH METHOD AND DEVICE IN CELLULAR COMMUNICATION SYSTEM

CROSS-REFERENCE TO RELATED APPLICATION(S)

The present application claims priority under 35 U.S.C. § 365 to International Patent Application No. PCT/KR2015/006959 filed Jul. 6, 2015, entitled "CELL SEARCH METHOD AND DEVICE IN CELLULAR COMMUNICATION SYSTEM", and claims a priority to Korean Patent Application No. 10-2014-0083664, filed on Jul. 4, 2014, which are incorporated herein by reference into the present disclosure as if fully set forth herein.

TECHNICAL FIELD

The present invention relates to a method and a device for cell searching by a terminal and a base station in a beamforming cellular communication system.

BACKGROUND ART

In a cellular communication system, a terminal receives a sync signal from a neighbor cell through cell discovery, secures a time and frequency sync of the neighbor cell, and obtains a number (i.e., a physical cell ID) of the neighbor cell, and as necessary, primary cell common control information. A base station simultaneously sends sync signals and cell common control information to all of the terminals in the cell using an antenna transmitting or receiving signals in all directions in the cell. Further, the terminal, because using an omni-directional antenna, simultaneously receives signals from neighboring base stations as well as the serving base station and does not experience interference with communication with the serving cell.

However, the terminal should measure the receive power of the neighbor cell to determine additional handover from the serving cell to the neighbor cell, but at the moment of measuring the receive power of the neighbor cell, the terminal might not decode signals from the serving cell depending on implementations of the terminal. Thus, the terminal sends a request for a gap time to the serving base station to measure the receive power of the neighbor cell, and during the gap time, the terminal may stop communication with the serving cell and measure the receive power of a reference signal from the neighbor cell. Further, the terminal uses the gap time to detect a base station and cell using a frequency different from the frequency that the serving cell uses.

However, in case the terminal uses the gap time, the communication efficiency is deteriorated due to the process of requesting the serving cell to allocate the gap time and receiving a response to discovery the neighbor cell. In particular, in case all of the terminals in the cell make use of the gap time allocation method whenever attempting to discovery a cell, the communication efficiency may drastically worsen.

As another example, when all of base stations send sync signals and cell common control information during the same, fixed slot time in a beamforming cellular communication system where a base station and a terminal transmit and receive signals through beamforming, the beamforming terminal sequentially switches receive beams while receiving signals from the serving cell and signals from a neighbor cell to sync with the serving cell and to discovery the neighbor cell in order to receive signals whatever directions the base station of the serving cell and the base station of the neighbor cell are positioned in. In such conventional beamforming cellular communication systems, in case the slot time allocated for sync signal and cell common control information does not have a fixed length, the terminal may fail to receive some signals from the serving cell or discover the neighbor cell due to the cell discovery operation. Further, since, in the conventional beamforming cellular communication systems, base stations use different beamforming apparatuses and methods per cell, a problem arises even when the length of a slot time allocated for sync signal and cell common control information differs from cell to cell. In particular, in case a slot time for sync signal allocated in the neighbor cell is longer than that in the serving cell, the terminal may receive none of sync signals from the neighbor cell and may resultantly fail to discover the neighbor cell. In case all of the base stations perform a cell discovery operation in compliance with the maximum slot length for sync and cell common control information allocable to address all such issues, the discovery of the neighbor cell may succeed, but a failure to receive control signals or data from the serving cell may occur, causing a failure in communication with the serving cell.

Thus, there is required a scheme for performing cell discovery by efficiently allocating a cell discovery time for cell discovery per terminal in a beamforming cellular communication system.

DISCLOSURE

Technical Problem

According to the present invention, there are provided a method and apparatus for performing cell discovery in a beamforming communication system.

According to the present invention, there are also provided a method and apparatus for performing cell discovery by efficiently determining a cell discovery time in a beamforming cellular communication system.

According to the present invention, there are also provided a method and apparatus for allowing a terminal to efficiently perform cell discovery in a beamforming cellular communication system even when a base station and terminal use different, unfixed beamforming methods and structures.

Technical Solution

According to an embodiment of the present invention, a method for performing cell discovery by a base station of a serving cell in a cellular communication system comprises the steps of receiving information about a beamforming capability of each of all of terminals in a cell, determining whether a cell discovery time needs to be expanded based on the received information about the beamforming capability per terminal, and transmitting group information about the cell discovery to a terminal needing the cell discovery time to be expanded.

According to an embodiment of the present invention, a method for performing cell discovery by a terminal in a cellular communication system comprises the steps of transmitting information about a beamforming capability, identifying whether a cell discovery time needs to be expanded, in a case where the cell discovery time needs to be expanded, receiving group information about the cell discovery from a base station of a serving cell, and discovering a neighbor cell in a frame corresponding to a group number included in the group information.

According to an embodiment of the present invention, an apparatus for performing cell discovery by a base station of a serving cell in a cellular communication system comprises a receiver receiving information about a beamforming capability of each of all of terminals in a cell, a controller determining whether a cell discovery time needs to be expanded based on the received information about the beamforming capability per terminal, and a transmitter transmitting group information about the cell discovery to a terminal needing the cell discovery time to be expanded.

According to an embodiment of the present invention, an apparatus for performing cell discovery by a terminal in a cellular communication system comprises a transmitter transmitting information about a beamforming capability, a controller identifying whether a cell discovery time needs to be expanded, in a case where the cell discovery time needs to be expanded, a receiver receiving group information about the cell discovery from a base station of a serving cell, and a discovery unit discovering a neighbor cell in a frame corresponding to a group number included in the group information.

MODE FOR INVENTION

Figure 1:
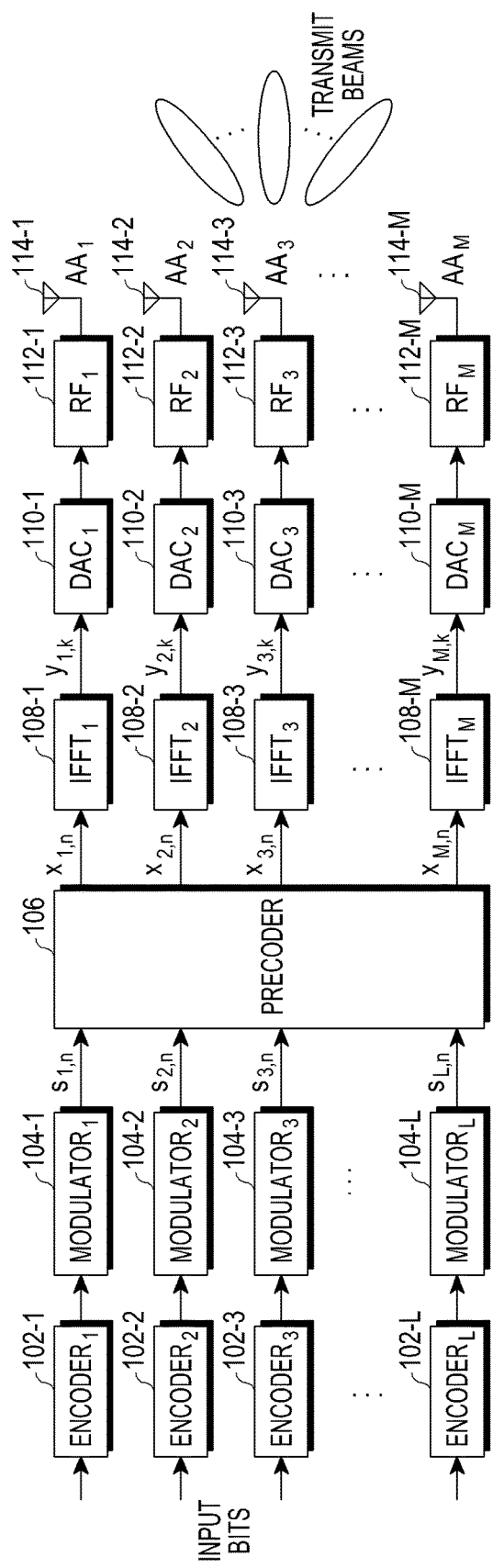
FIG. 1 is a view schematically illustrating a configuration of a transmitter in a beamforming cellular communication system according to the present invention.

Hereinafter, preferred embodiments of the present invention are described in detail with reference to the accompanying drawings. It should be noted that the following description primarily focuses on what is necessary for understanding the operations of the embodiments, omitting descriptions unnecessary for clarifying the subject matter of the present invention.

The gist of the present invention is to provide a method and apparatus for determining a cell discovery time required per cell in a beamforming cellular communication system and performing cell discovery during the determined cell discovery time.

To that end, a beamforming cellular communication system according to the present invention is described, followed by a method and apparatus for performing cell discovery in a beamforming cellular communication system according to embodiments of the present invention.

First, the beamforming cellular communication system may present the advantages that the base station and terminal may raise the receive power of signals as high as a beam gain using a beamforming method and may reduce interference by a narrowed beam to increase communication capability. The base station should communicate with all of the terminals in the cell. In case the base station uses beamforming, however, terminals with which it may communicate using any one beam are limited to ones in some area of the cell, and to communicate with terminals at other positions, the base station should use other beams. The base station may generate only one beam at a time, generate only multiple ones of all the beams at a moment, or simultaneously generate all of the beams at each moment, depending on the complexity of the beamforming method and apparatus that it uses. Embodiments of the present invention are not limited by beamforming environments of the base station, and rather, consider all of the environments where only one type of base stations are present, some types of base stations co-exist, or all types of base stations co-exist simultaneously.

In the beamforming cellular communication system, the base station should transmit, through beamforming, signals that should commonly be received by all the terminals in the cell, such as sync signals and cell common control information, as well as control signals or data only for certain terminals. Hence, in case the base station generates one or a few beams at a time, the base station repeatedly sends signals that should be received by all the terminals in the cell, while switching beams. At this time, the number of times of repetition varies depending on the maximum number of beams generated by the base station, the width of each beam, or the number of beams simultaneously generated.

In the beamforming cellular communication system, the terminal generates a plurality of narrow beams and transmits and receives signals in all directions to communicate with the base station. At this time, the signal transmission and reception by the base station communicating using each narrow beam are limited by the beam width and direction, and the optimal beam of the terminal varies depending on the position and direction of the base station relative to the terminal. The terminal may generate only one at a time, multiple ones of all the beams at a time, or all the beams at the same time depending on the complexity of the beamforming apparatus and method of the terminal. According to an embodiment of the present invention, all the situations are taken into account where only a certain type of terminal exists, some types of terminals co-exist, or all types of terminals co-exist, without limited by beamforming circumstances of the terminal.

Further, in the beamforming cellular communication system, the terminal relocates while communicating using any one cell and base station as the serving cell and base station, thus causing a change of the optimal cell and base station. Thus, the terminal always and inevitably performs a cell discovery operation for discovering a cell and base station. A new base station may be present in any direction from the terminal. Thus, the terminal should receive signals through its beams of all directions to discover the new base station. In case the terminal may generate only one or some multiple beams at a time, the terminal repeatedly receives signals while switching the receive beams in order to receive signals in all directions. At this time, the number of times of repetition varies depending on the width of beams generated by the terminal, the number of all the beams, and the number of beams simultaneously generated.

FIG. 1 is a view schematically illustrating a configuration of a transmitter in a beamforming cellular communication system according to the present invention.

Referring to FIG. 1, the transmitter includes L encoder units 102-1 to 102-L, L modulator units 104-1 to 104-L, a precoder unit 106, M inverse fast Fourier transform (IFFT) units 108-1 to 108-M, M digital to analogue converter (DAC) units 110-1 to 110-M, M radio frequency (RF) units 112-1 to 112-M, and M antenna array units 114-1 to 114-M. Here, L and M are natural numbers not less than 1.

Bits intended to be transmitted from the transmitter are inputted and encoded by the L encoder units 102-1 to 102-L, and the encoded bits are inputted to the L modulator units 104-1 to 104-L to be modulated as symbols. The modulated symbols are inputted to the precoder unit 106 to be precoded. At this time, the precoder unit 106 may perform additional beamforming on a plurality of transmit beams simultaneously transmitted. As an example, the precoder unit 106 may perform precoding as in Equation 1 so as to send L transmit symbols $s_{1,n}, \ldots, s_{L,n}$ to the M antenna array units 114-1 to 114-M.

$$\begin{bmatrix} x_{1,n} \\ x_{2,n} \\ \vdots \\ x_{M,n} \end{bmatrix} = \begin{bmatrix} p^n_{1,1} & p^n_{1,2} & \cdots & p^n_{1,L} \\ p^n_{2,1} & p^n_{2,2} & \cdots & p^n_{2,L} \\ \vdots & \vdots & \ddots & \vdots \\ p^n_{M,1} & p^n_{M,2} & \cdots & p^n_{M,L} \end{bmatrix} \begin{bmatrix} s_{1,n} \\ s_{2,n} \\ \vdots \\ s_{L,n} \end{bmatrix} = P^n \begin{bmatrix} s_{1,n} \\ s_{2,n} \\ \vdots \\ s_{L,n} \end{bmatrix} \quad \text{[Equation 1]}$$

In Equation 1 above, $P^n$ denotes a M×L precoder matrix for subcarrier n.

In this embodiment, hereinafter, a beamforming scheme through the precoder unit 106 of FIG. 1 is defined as digital beamforming, and a beamforming scheme through the M RF units 112-1 to 112-M is defined as analog beamforming for ease of description.

The transmit signals $x_{1,n}, \ldots, x_{M,n}$ digital beamformed for subcarriers, respectively, by the precoder unit 106 are converted into time domain signals through the plurality of IFFT units 108-1 to 108-M, respectively, to be transmitted to the M antenna array units 114-1 to 114-M. At this time, the relation between the signals inputted to the M IFFT units 108-1 to 108-M and the signals outputted therefrom may be represented as Equation 2.

$$[y_{m,1}\ y_{m,2}\ \cdots\ y_{m,N}] = [x_{m,1}\ x_{m,2}\ \cdots\ x_{m,N}] F^{-1} \quad \text{[Equation 2]}$$

In Equation 2, $F^{-1}$ represents a N-point IFFT matrix.

Thus, the transmitter of FIG. 1 may simultaneously support analog beamforming and digital beamforming.

Signals respectively outputted from the M IFFT units 108-1 to 108-M may be inputted to the M DAC units 110-1 to 110-M, respectively, to be converted into analog signals. The converted analog signals are inputted to the M RF units 112-1 to 112-M, respectively, and converted into desired frequencies and are send through the M antenna array units 114-1 to 114-M, respectively. Here, operations between one of the M RF units 112-1 to 112-M and one of the plurality of antenna array units 114-1 to 114-M are described below in detail with reference to FIG. 2.

Figure 2:
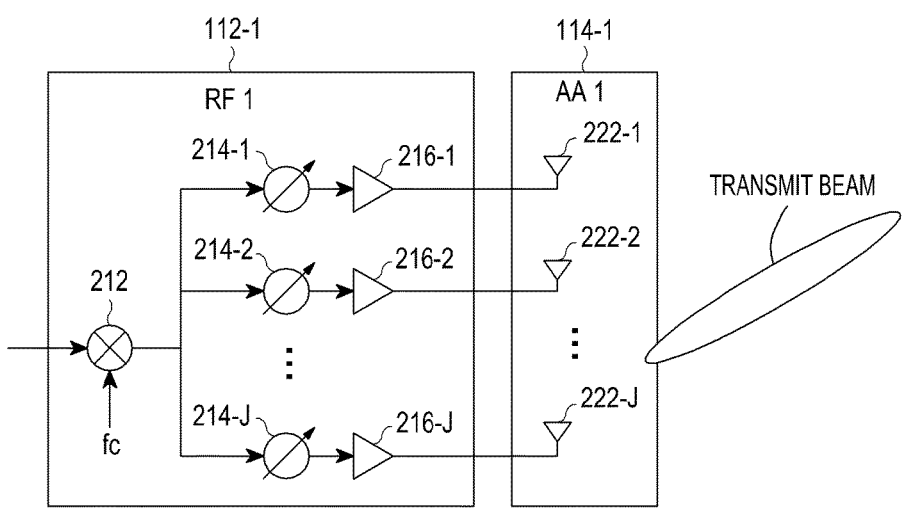
FIG. 2 is a view specifically illustrating configurations of a RF unit and antenna array unit in the transmitter of FIG. 1 according to the present invention.

FIG. 2 is a view specifically illustrating configurations of a RF unit and antenna array unit in the transmitter of FIG. 1 according to the present invention. As an example, FIG. 2 illustrates one RF unit and antenna array unit as a RF1 unit 112-1 and antenna array unit 214-1, and the other RF1 units and antenna array units have the same configuration as the RF1 unit 112-1 and antenna array unit 214-1.

Referring to FIG. 2, the RF1 unit 112-1 converts the frequency of an inputted signal, and the antenna array unit 214-1 converts the phase of the signal. Specifically, the RF1 unit 112-1 includes a mixer 212, J phase converters 214-1 to 214-J, and J high power amplifiers 216-1 to 216-J. The antenna array unit 114-1 includes J antennas 222-1 to 222-J.

The mixer 212 converts the frequency of an inputted signal into a desired transmit frequency fc, and the J phase converters 214-1 to 214-J convert the phase of the frequency-converted signal into J phases, and the J high power amplifiers 216-1 to 216-J amplify the J phase-converted signals. The J antennas 222-1 to 222-J simultaneously send the J amplified signals to the receiver.

Here, the signal transmitted through the RF1 unit 112-1 and antenna array unit 114-1 of FIG. 2 forms one beam at a time, and the width and direction of the beam are determined depending on the number J of antennas, the shape of the arrangement of the antennas, and the value of the phase converters 214-1 to 214-J. The RF1 unit 112-1 and antenna array unit 114-1 of FIG. 2 may vary the direction of transmit beam if the value of the phase converters 214-1 to 214-J is varied.

Figure 3:
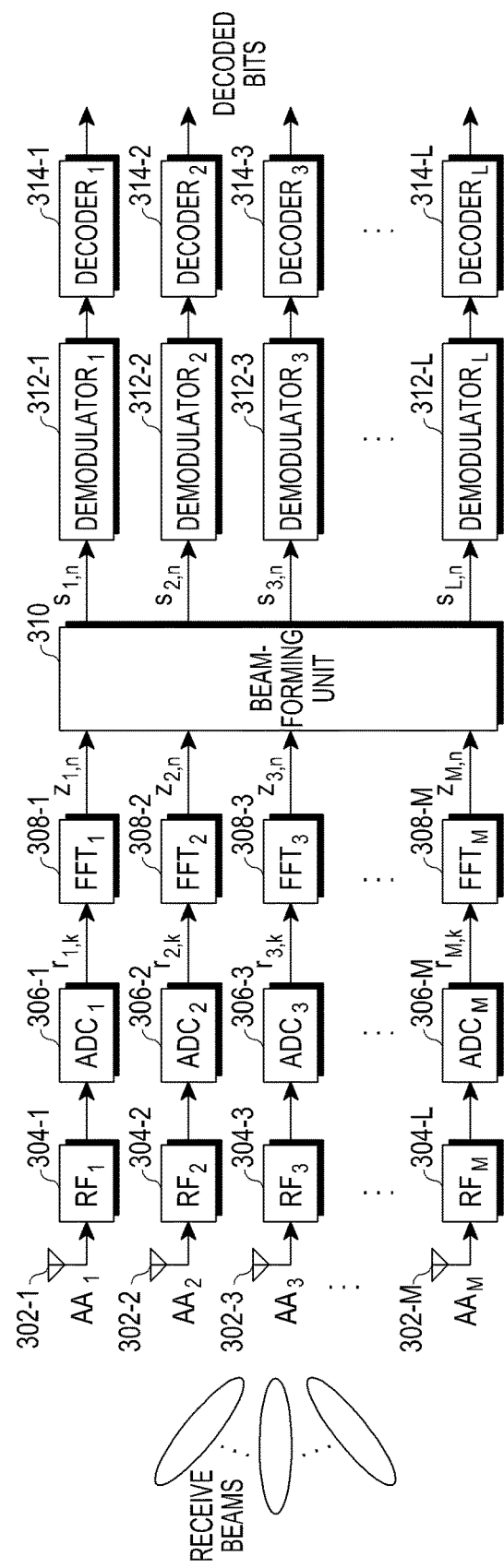
FIG. 3 is a view schematically illustrating a configuration of a receiver in a beamforming cellular communication system according to the present invention.

FIG. 3 is a view schematically illustrating a configuration of a receiver in a beamforming cellular communication system according to the present invention.

The configuration of the receiver shown in FIG. 3 corresponds to the configuration of the transmitter shown in FIG. 1. In other words, referring to FIG. 3, the receiver includes M antenna array units 302-1 to 302-M, M RF units 304-1 to 304-M, M ADC units 306-1 to 306-M, M FFT units 308-1 to 308-M, a beamforming unit 310, L demodulator units 312-1 to 312-L, and L decoder units 314-1 to 314-L.

M analog signals transmitted from the transmitter are received through the plurality of antenna array units 302-1 to 302-M and the plurality of RF units 304-1 to 304-M. The received analog signals are converted into digital signals $r_{1,k}, \ldots, r_{M,k}$ through the analogue to digital converter (ADC) units 306-1 to 306-M converting a plurality of analog signals into digital signals and are converted into frequency domain signals $z_{1,n}, \ldots, z_{M,n}$ through the plurality of FFT units 3081 to 308-M. Here, the relation by which the plurality of FFT units 308-1 to 308-M may perform N-point FFT on the converted digital signals $r_{m,1}, \ldots, r_{m,N}$ to convert into OFDM signals $z_{m,1}, \ldots, z_{m,N}$ may be represented as in Equation 3 below.

$$[z_{m,1}\ z_{m,2} \ldots z_{m,N}] = [r_{m,1}\ r_{m,2} \ldots r_{m,N}] F^{-1} \quad \text{[Equation 3]}$$

In Equation 3, F represents a N-point FFT matrix.

Reception beamforming is performed through the beamforming (W″) unit 310 in the respective subcarrier n's of the OFDM signals, which may be represented as in Equation 4.

$$\begin{bmatrix} \hat{s}_{1,n} \\ \hat{s}_{2,n} \\ \vdots \\ \hat{s}_{L,n} \end{bmatrix} = \begin{bmatrix} w^n_{1,1} & w^n_{1,2} & \cdots & w^n_{1,M} \\ w^n_{2,1} & w^n_{2,2} & \cdots & w^n_{2,M} \\ \vdots & \vdots & \ddots & \vdots \\ w^n_{L,1} & w^n_{L,2} & \cdots & w^n_{L,M} \end{bmatrix} \begin{bmatrix} z_{1,n} \\ z_{2,n} \\ \vdots \\ z_{M,n} \end{bmatrix} = W^n \begin{bmatrix} z_{1,n} \\ z_{2,n} \\ \vdots \\ z_{M,n} \end{bmatrix} \quad \text{[Equation 4]}$$

In Equation 4, the beamforming (W″) unit 310 in each subcarrier n is configured of a L×M matrix.

L symbols obtained through the beamforming (W″) unit 310 are demodulated through the plurality of demodulator units 312-1 to 312-L, and the demodulated symbols are simultaneously detected as L data items through the plurality of decoder units 314-1 to 314-L.

The receiver in the beamforming cellular communication system of FIG. 3 may simultaneously support analog beamforming and digital beamforming by such method.

Figure 4:
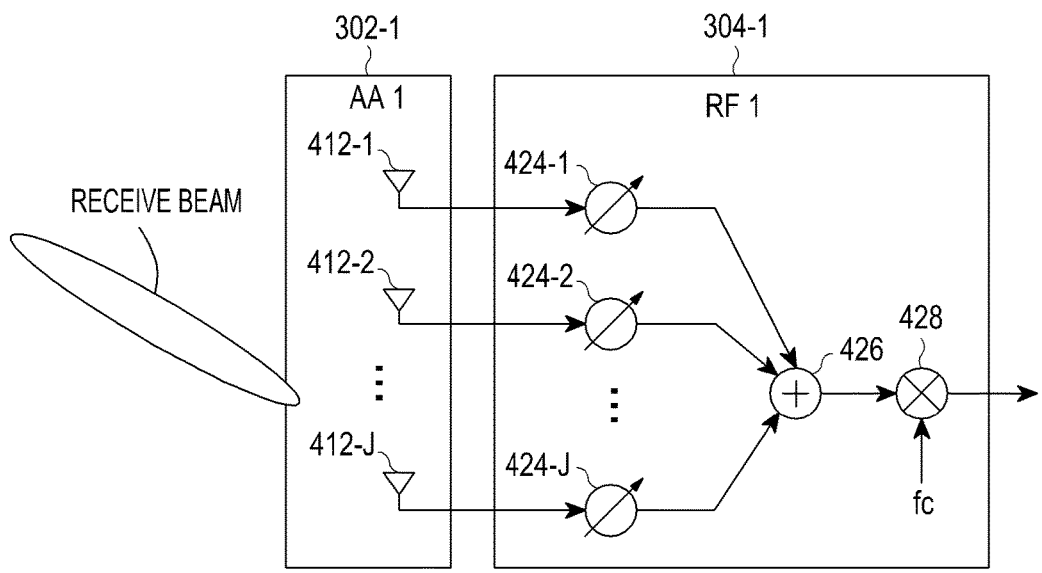
FIG. 4 is a view specifically illustrating configurations of an antenna array unit and RF unit in the receiver of FIG. 3 according to the present invention.

FIG. 4 is a view specifically illustrating configurations of an antenna array unit and RF unit in the receiver of FIG. 3 according to the present invention. As an example, FIG. 4 illustrates one antenna array unit and RF unit as an antenna array unit 302-1 and RF1 unit 304-1, and the other antenna array units and RF units have the same configuration as the antenna array unit 302-1 and RF1 unit 304-1.

Referring to FIG. 4, the antenna array unit 302-1 includes J antennas 412-1 to 412-J. The RF1 unit 304-1 includes J phase converters 424-1 to 424-J, an adder 426, and a mixer 428.

The antenna array unit 302-1 simultaneously receives signals through the J antennas 412-1 to 412-J. The J phase converters 424-1 to 424-J in the RF1 unit 304-1 convert the receive signals to have different phases, the adder 426 adds the J phase-converted receive signals, and the mixer 428 converts the frequency of the added signals into a frequency desired by the receiver.

Here, the signal received through the antenna array unit 302-1 and the RF1 unit 304-1 forms one analog receive beam at a time, and the width and direction of the beam are determined depending on the number J of antennas, the shape of the arrangement of the antennas, and the value of the J phase converters 424-1 to 424-J. The antenna array unit 302-1 and the RF1 unit 304-1 may vary the direction of the analog receive beam by changing the value of the J phase converters 424-1 to 424-J.

According to an embodiment of the present invention, an environment is considered where various beamforming structures and techniques are applied in the base station and terminal. In the beamforming cellular communication system as shown in FIGS. 1 and 3, in case M=1, and J>1, i.e., in case only one antenna array is used, the beamforming cellular communication system performs only analog beamforming but not digital beamforming, and particularly, it generates only one analog beam at a time. In this case, the value of the plurality of phase converters is varied at different moments of transmission and reception so as to change the beam direction. Further, in this case, only one stream (L=1) of data may be transmitted and received.

On the contrary, in case J=1 and M>1 in the beamforming cellular communication system of FIGS. 1 and 3, the beamforming cellular communication system performs only digital beamforming, but not analog beamforming, and in particular, it may always and simultaneously generate M beams which are a maximum number of beams. Thus, in this case, all M-directional beams as generatable may always and simultaneously be generated, and up to L (L≤M) streams of data may simultaneously be transmitted and received, advantageously increasing the maximum data transmission speed very high. A cellular communication system performing only digital beamforming (J=1, M>1) under the condition where beams of the same width are generated may simultaneously generate more beams than does a cellular communication system, 100%, performing only analog beamforming (J>1, M=1) and it may thus transmit and receive data at a higher transmission speed. However, a 100% digital beamforming cellular communication system is significantly high complicated in implementation as compared with a 100% analog beamforming cellular communication system. Thus, in an actual communication environment, an intermediate level beamforming cellular communication system between the 100% digital beamforming (J=1, M>1) cellular communication system and the 10-0% analog beamforming (J>1, M=1) cellular communication system may be put to use. For example, a beamforming cellular communication system may be taken into consideration, which simultaneously generates two or four narrow beams under such limitations as M=2 or 4 and J=32 or 64. Further, macro cell base stations prioritize system capability and do not care about complexity in implementation and high price. In contrast, pico cell or femto cell base stations highly care about implementation complexity, small size, and low price, but not about capability although their capability is lower than that of macro cell base stations. Hence, in an actual environment, various types of base stations may come into use which have different beamforming schemes or techniques, degrees of implementation complexity and performances. Further, terminals may also use different types of beamforming methods depending on price. An embodiment of the present invention considers a communication environment where base stations and terminals having such various beamforming structures and techniques co-exist.

Figure 5:
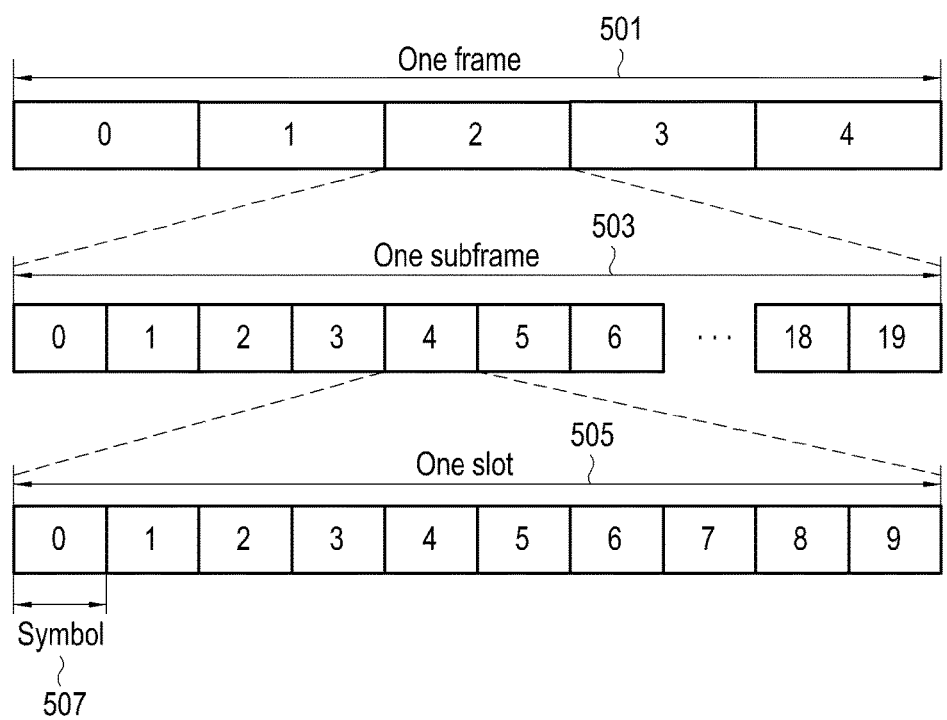
FIG. 5 is a view illustrating a configuration of a frame in a beamforming cellular communication system according to the present invention.

FIG. 5 is a view illustrating a configuration of a frame in a beamforming cellular communication system according to the present invention.

Referring to FIG. 5, the base station and terminal transmit and receive signals of frames 501 having a fixed size through beamforming. One frame includes multiple subframes 503 having a fixed length, and one subframe includes multiple slots 505 having a fixed length. One slot includes multiple symbols 507 having a fixed length. For example, the frame 501 includes five subframes, one subframe 503 includes 20 slots, and one slot 505 includes ten symbols. At this time, the number of symbols constituting the slot 505 is determined depending on the length of a protection section (cyclic prefix (CP)) included in each symbol. For example, if the frame 501 is 5 ms long, one subframe 503 is 1 ms long, one slot 505 50 us long, and one symbol 507 5 us long.

In the frame structure as shown in FIG. 5, the communication system configures the frame distinctly as a synchronization signal (SS) and cell common control information (broadcast channel (BCH) slot, beam measurement slot, control slot, and data slot. Here, although the size of the frame, subframe, and slot are fixed, the number or combination of the slots selected to configure one subframe may be varied depending on the hardware capability of base station, antenna structure, beamforming method, deployment environment, and the number of terminals. According to an embodiment of the present invention, each frame is assumed to include at least one of a sync signal and cell common control information.

Figure 6:
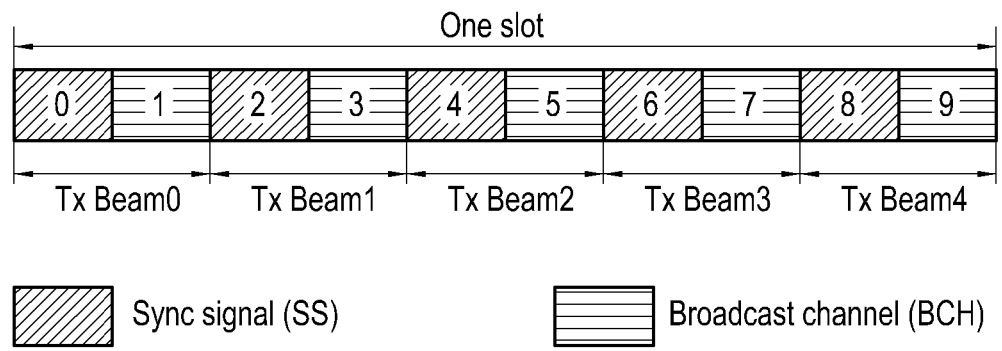
FIG. 6 is a view illustrating a configuration for a sync signal and common control information slot in a frame of a beamforming cellular communication system according to an embodiment of the present invention.

FIG. 6 is a view illustrating a configuration for a sync signal and cell common control information slot in a frame of a beamforming cellular communication system according to an embodiment of the present invention.

All the terminals should be able to receive sync signals and cell common control information regardless of their position in the cell. In other words, the terminals receive sync signals to sync with the cell and obtain the whole or portion of information about their cell IDs. The terminals obtain various pieces of information necessary to receive additional information about the cell IDs and cell signals by receiving the cell common control information.

However, in case the base station sends signals through narrow beams, only terminals in a limited cell area receive sync signals and cell common control information. To address the issue (i.e., in order for all of the terminals in the cell to receive the sync signals and cell common control information), the base station sends the sync signals and cell common control information repeatedly and several times while varying the beams.

Here, the number of times of the repetition is varied depending on the number of the beams of the base station, beam width, or area of the cell. Further, in case the base station has a plurality of antenna arrays (i.e., M>1) and is able to simultaneously send a plurality of beams, the number of times of repetition may be reduced by selecting different directions of the beams simultaneously transmitted.

FIG. 6 illustrates an embodiment where sync signals and cell common control information are continuously sent through each slot during one slot time. Here, the sync signals and cell common control information may also be transmitted during different, separate times in the frame. Although the present embodiment is described in which the sync signal and cell common control information are transmitted in the same slot for ease of description, embodiments of the present invention may also be applicable where the sync signal and cell common control information are transmitted during different times or in different slots.

Further, the slot shown in FIG. 6 is positioned in a designated area of the frame. For example, the base station always sends the sync signal and cell common control information in slot 1 of subframe 0 of FIG. 5. FIG. 6 illustrates transmission of sync signals and cell common control information while switching transmit beams five times in one slot. That is, the transmitter sends sync signals and cell common control information through transmit beams 0, 1, 2, 3, and 4 in symbols 0 and 1, symbols 2 and 3, symbols 4 and 5, . . . , symbols 8 and 9. The transmitter includes and sends the sync signals or cell common control information so that the receiver may identify what number of sync signal and cell common control information is sent among ones repeatedly sent. Although the number of sync signal and cell common control information slots in each frame may differ from base station to base station, they presumably start at fixed positions and are present continuously. For example, in case sync signals and cell common control information are attempted to be sent while switching transmit beams ten times, slots 1 and 2 in subframe 0 are allocated as sync signal and cell common control information slots.

If the base station may generate all directional beams simultaneously or within two or three times, the sync signals and cell common control information may be sent through some symbols of control slots or data slots without designating dedicated slots therefor.

Figure 7:
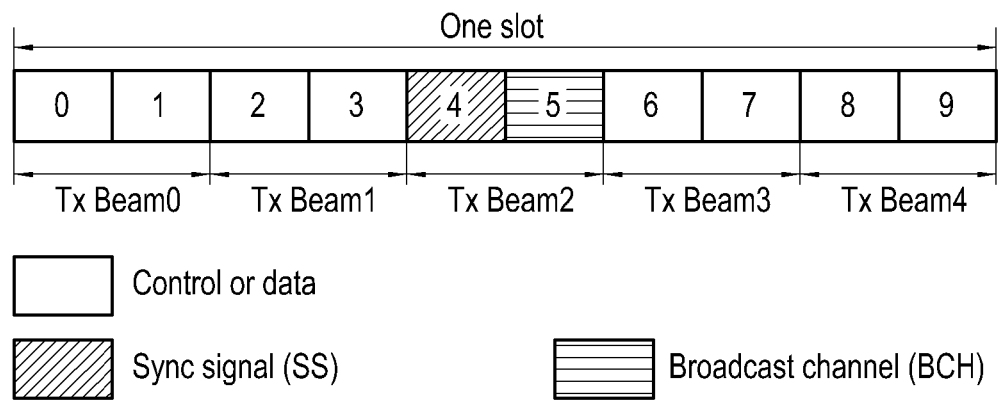
FIG. 7 is a view illustrating a configuration of a slot in a frame of a beamforming cellular communication system according to an embodiment of the present invention.

FIG. 7 is a view illustrating a configuration of a slot in a frame of a beamforming cellular communication system according to an embodiment of the present invention.

Referring to FIG. 7, symbols in one slot of a frame are used to send control or data and sync signals and cell common control information. In particular, the frame shown in FIG. 7 represents a case where sync signals and cell common control information are sent in all beam directions at one time.

The terminal obtains a cell time and frequency sync through cell discovery and detects a cell number (Physical Cell ID). Additionally, the terminal receives information necessary for receiving signals from the cell by receiving the cell common control information. According to an embodiment of the present invention, an exemplary process is described in which the terminal obtains a time sync of a cell whose cell number or sync signal number is c by receiving a sync signal and cell common control information as shown in FIG. 7 or a sync signal and cell common control information slot as shown in FIG. 6 while simultaneously detecting the cell.

The terminal receives a signal $y(b)_k$ within a candidate time period for the sync signal and cell common control information slot, performs correlation with a signal $s(c)_k$ generated with the cell or sync signal number c, and calculates a time $k(c,b)_{opt}$ for maximizing a metric value $|U(c,b)_k|^2/P(b)_k$ normalized with the receive power $P(b)_k$ as in Equation 5.

$$k(c;b)_{opt} = \operatorname{argmax}_k |U(c;b)_k|^2 / P(b)_k \qquad \text{[Equation 5]}$$

$$U(c;b)_k = \sum_{n=0}^{N-1} y(b)_{k+n-N+1} s(c)_n^*$$

$$P(b)_k = \sum_{n=0}^{N-1} |y(b)_{k-n}|^2$$

In Equation 5 above, in case the maximum value of the correlation value $|U(c,b)_k|$ for each cell or sync signal number c is larger than a predetermined reference value, the terminal may determine that the cell or the cell whose sync signal number is c has been detected, and if smaller than the reference value, may determine that the cell or the cell whose sync signal number is c has not been detected.

Next, the terminal performs a N-point FFT on a signal sample of $k(c,b)_{opt}+N_{CP}+N-1$ in $k(c,b)_{opt}+N_{CP}$ and detects a signal of cell common control information by a predetermined method for receiving cell common control information. Here, $N_{CP}$ represents the length of a cyclic prefix (CP), and N represents the FFT length of an orthogonal frequency division multiple (OFDM) symbol signal.

The terminal may be aware of the time of start of the cell frame by receiving the cell common control information without errors, e.g., by identifying what number of sync signal and cell common control information has been received, and additionally, the terminal may obtain other information regarding the cell by including the complete cell number of the cell. The above-described cell discovery and sync obtaining method is the same for the neighbor cell and serving cell.

In case the terminal transmits and receives signals through beamforming, the optimal terminal beam varies depending on the direction of the base station. The serving cell base station and multiple neighbor cell base stations for one terminal are positioned in different directions from the terminal. Thus, in order for the terminal to discover a neighbor cell while in communication with the serving cell, it should change the receive beam into a beam other than the beam optimal for the serving cell. In case the terminal may not generate all directional beams simultaneously, but only a limited number of beams, if the receive beam is changed for cell discovery, signals from the serving cell might not be optimally received. In order for the terminal to be able to receive various control signals and data from the serving cell without any problem while receiving the sync signal and cell common control information of the serving cell frame, the switch of receive beams for cell discovery by the terminal is limited as being done, e.g., within the sync signal and cell common control information slot section of the serving cell frame while serving cell signals are received using the beam optimal for the serving cell during the other time sections. However, since the terminal should sync with the serving cell to remain in communication with the serving cell, it should receive the sync signal and cell common control information slot of the serving cell as well. Hence, the terminal, for example, syncs with the serving cell by receiving the receive beam optimal for the serving cell in one frame while sequentially switching receive beams to discover a neighbor cell in other frames in order to receive all of the sync signals and cell common control information signals from the serving cell and neighbor cells. However, in case the terminal may simultaneously generate beams in all directions, the terminal is able to simultaneously receive signals from the serving cell and neighbor cell, and thus, such cell discovery issue does not arise.

Figure 8:
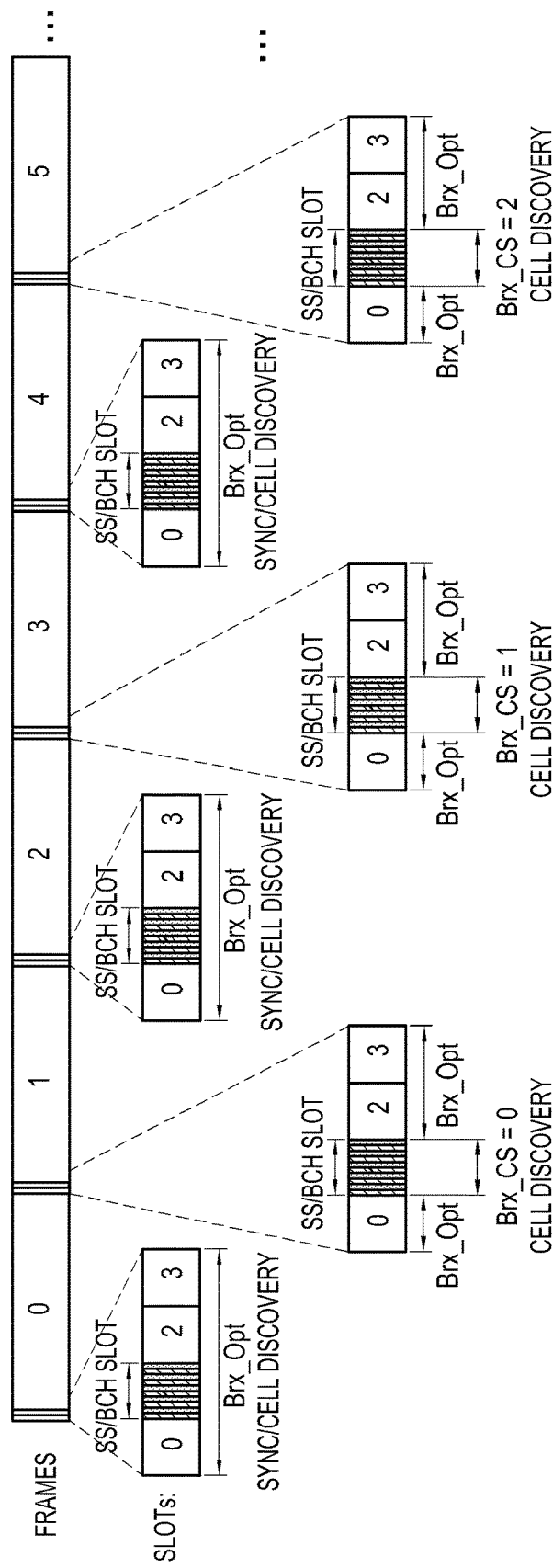
FIG. 8 is a view illustrating an example of a receive beam switch for a terminal to discover a neighbor cell while syncing with a serving cell by receiving all of sync signals and common control information slots of the neighbor cell and serving cell according to an embodiment of the present invention.

FIG. 8 is a view illustrating an example of a received beam switch for a terminal to discover a neighbor cell while syncing with a serving cell by receiving all of sync signals and common control information slots of the neighbor cell and serving cell according to an embodiment of the present invention.

Referring to FIG. 8, the frame represents the case where slot 1 of subframe 0 is a sync signal and cell common control information slot. The terminal receives signals using a beam Brx_Opt which is optimal for the serving cell. For example, in an even-numbered frame, the terminal syncs with the serving cell by receiving the beam Brx_Opt in slot 1 of subframe 0 while simultaneously discovering another cell, i.e., the neighbor cell, through a signal received through the beam Brx_Opt. In an odd-numbered frame, the terminal switches the receive beam into Brx_CS at the time of start of slot 1 of subframe 0 and discovers the neighbor cell, and if the slot 1 time expires, switches the receive beam back into Brx_Opt to receive signals from the serving cell. At this time, since the terminal may previously be unaware of the position and direction of the neighbor cell, the terminal sequentially changes the receive beam Brx_CS from frames 1, 3, 5, . . . to frames 0, 1, 2, . . . to receive signals in all directions. However, in case the terminal may simultaneously generate beams in all directions, the terminal establishes sync by receiving the sync signal and cell common control information slot through the beam Brx_Opt optimal for the serving cell while simultaneously receiving signals through all directional beams to discover the neighbor cell.

According to an embodiment of the present invention, an environment is taken into account where the base station uses various antenna structures and beamforming methods, and an environment considered to that end is that the number of sync signals and cell common control information is not fixed to one. In order for the terminal to perform cell discovery in such beamforming cellular communication system, the terminal should receive information about the length of slots allocated as the sync signal and cell common control information designated by the neighbor cell and serving cell. Where such information is not provided to the terminal so that the time taken for the terminal to do cell discovery differs from the sync signal and cell common control slot actually designated, a problem arises. In case the terminal conducts cell discovery for a time longer than in an actual situation, the terminal fails to receive some of signals from the serving cell. On the contrary, when the terminal performs cell discovery for a shorter time, the terminal may fail to discovery the neighbor cell. To address such issue, according to an embodiment of the present invention, there is provided means for the terminal to receive information about the sync signal and cell common control information slot designated to either or both of the serving cell and neighbor cell.

Further, in case the base stations of neighbor cells use different antenna structures and beamforming methods, the number of sync signal and cell common control information slots may be rendered to differ between the neighbor cells. The present embodiment of the present invention also considers such environment. For example, in a communication environment where a macro cell and a pico cell co-exist, the macro base station and pico base station may use different antenna structures and beamforming methods due to differences in price and hardware complexity. Hence, the terminal should receive information about the length of the sync signal and cell common control information slots designated in the serving cell and neighbor cell so as to perform cell discovery. In case the length of the sync signal and cell common control information slot designated in the serving cell is the same or larger than the length of the slot designated in the neighbor cell, the terminal performs cell discovery based on the length of the sync signal and cell common control information slot designated in the serving cell, in which case no problem arises.

Figure 9:
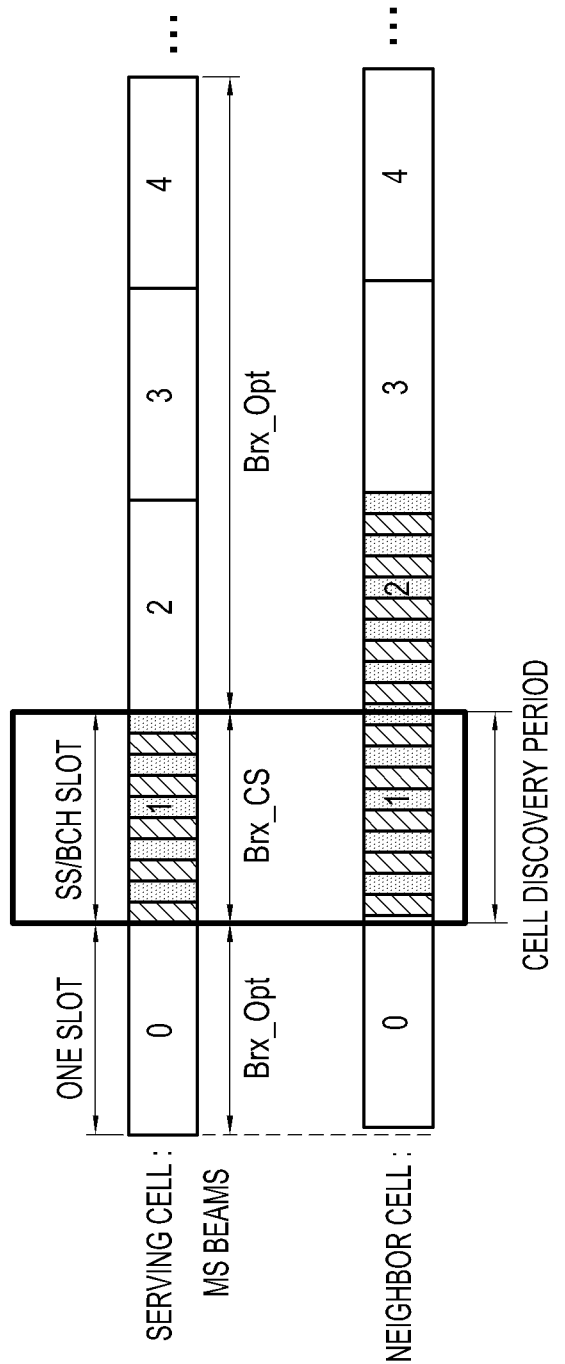
FIGS. 9 to 12 are views illustrating frame configurations of a serving cell and neighbor cell.

However, in case the length of the sync signal and cell common control information slot designated in the serving cell differs from the length of the sync signal and cell common control information slot designated in the neighbor cell as shown in FIG. 9, discovery of the neighbor cell may fail. FIGS. 9 to 12 are views illustrating frame configurations of a serving cell and neighbor cell.

In case the length of the sync signal and cell common control information slot designated in the serving cell is smaller than the length of the slot designated in the neighbor cell as shown in FIG. 9, if the terminal which may generate some beams at a time tries to discover the neighbor cell based on the slot length of the serving cell, discovery of the neighbor cell may fail.

Figure 10:
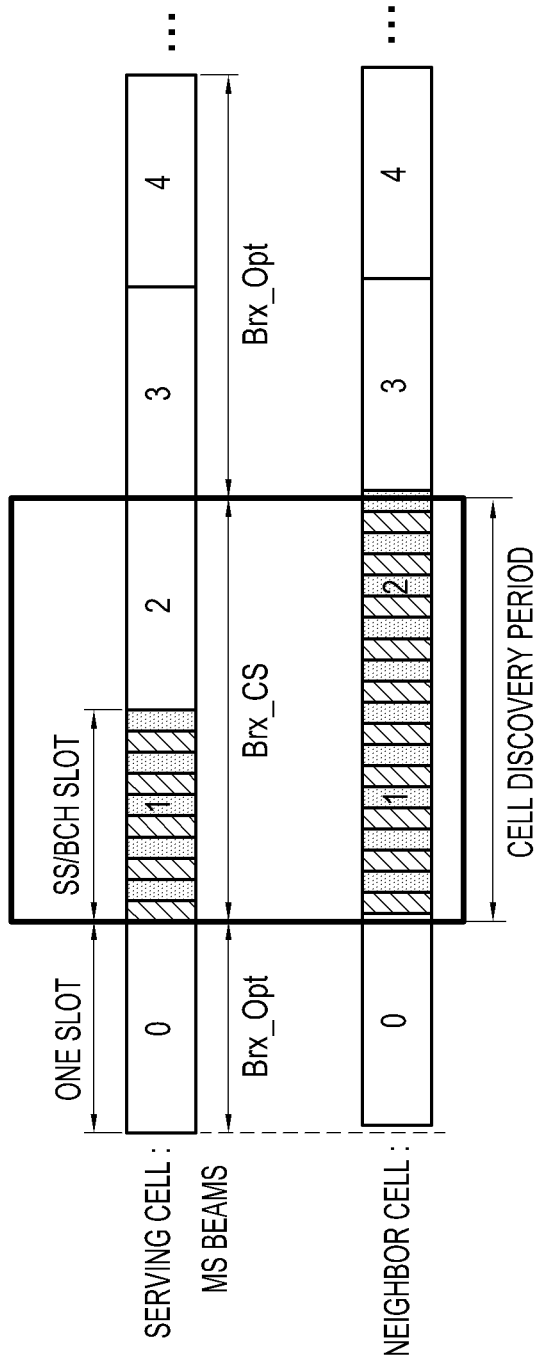

In contrast, in case the terminal attempts to discover the neighbor cell based on the slot length of the neighbor cell for the cell discovery time as shown in FIG. 10, the terminal does not face a problem with neighbor cell discovery but may fail to receive some signals from the serving cell. In FIG. 10, since the terminal switches the receive beam into Brx_CS in order to add slot 2 to the cell discovery period or expand the cell discovery period for neighbor cell discovery and receive the sync signal and cell common control information of the neighbor cell during the time of slots 1 and 2, the terminal does not optimally receive signals from the serving cell. If the serving cell sends a control signal or data to the terminal in slot 2, the terminal might not receive the control signal or data.

According to an embodiment of the present invention, there is provided a means allowing the terminal to face no problems with cell discovery and communication with the serving cell although the length of the sync signal and cell common control information slot of the serving cell is smaller than that of the neighbor cell.

In case the base station generates beams in all directions, if it sends sync signals and cell common control information once or two or three times in the control slot or data slot as shown in FIG. 7, it may send beams in the whole coverage of its cell. In case inter-cell sync is not precisely established in such beamforming cellular communication system, the terminal may fail in cell discovery as shown in FIG. 11.

Figure 11:
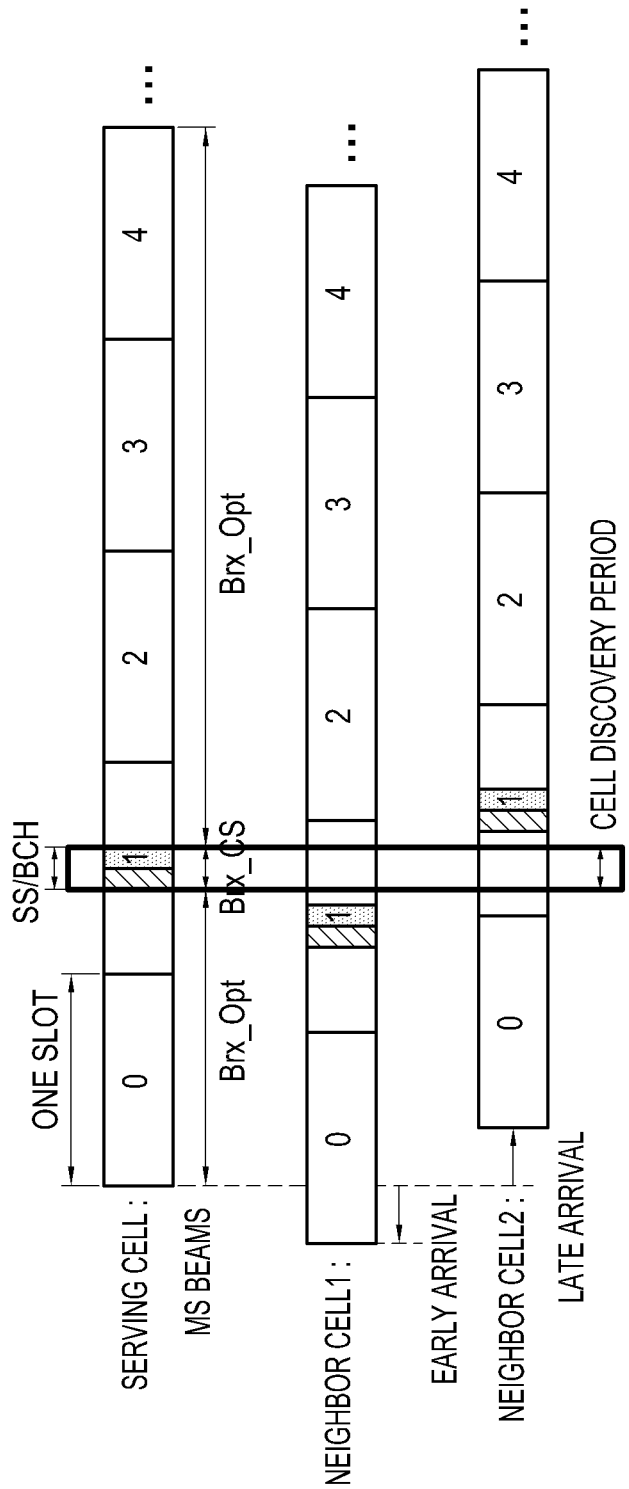
Figure 12:
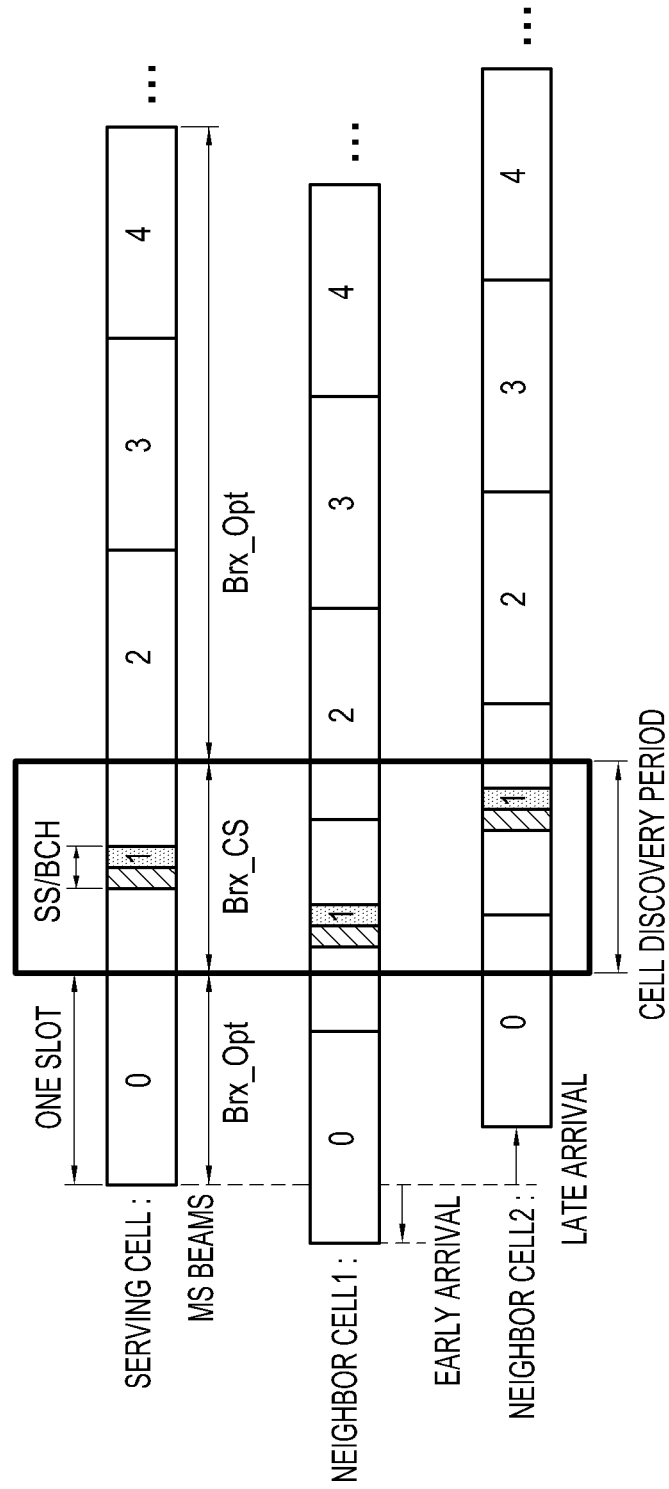

In FIG. 11, the terminal switches the receive beam into Brx_CS during a two-symbol time and discovers a cell. While a signal from the neighbor cell comes earlier or later so that the terminal receives through the receive beam Brx_CS, it might not receive the sync signal and cell common control information of the neighbor cell and may fail in cell discovery. In such case, expanding the cell discovery period forward or backward, e.g., one slot further, may allow for discovery of the neighbor cell. In this case, however, a failure to receive the signal of the control slot or data slot of the serving cell where the sync signal and cell common control information is transmitted may occur. Further, although the base station sends one or more sync signal and cell common control information slots, if the time when neighbor cell signals received by the terminal are synced for frames makes a significant difference from the time of frame sync of signals of the serving cell, the same problem as in FIG. 1 may occur, causing the terminal a failure in cell discovery. Also in such case, the cell discovery period should be expanded forward or backward. Some signals from the serving cell might not be received due to the neighbor cell discovery. According to the present invention, there is provided a means preventing any problem from being raised on cell discovery and communication with the serving cell even when a difference in frame sync time between a plurality of cells is significant so that the terminal needs to expand the cell discovery time for receiving sync signals or sync signals and cell common control information.

In order to address issues raised upon failure of cell discovery as set forth above, described below are a method for providing a method and apparatus of determining a cell discovery time required per terminal in a beamforming cellular communication system and performing cell discovery during the determined cell discovery time, according to an embodiment of the present invention.

Figure 13:
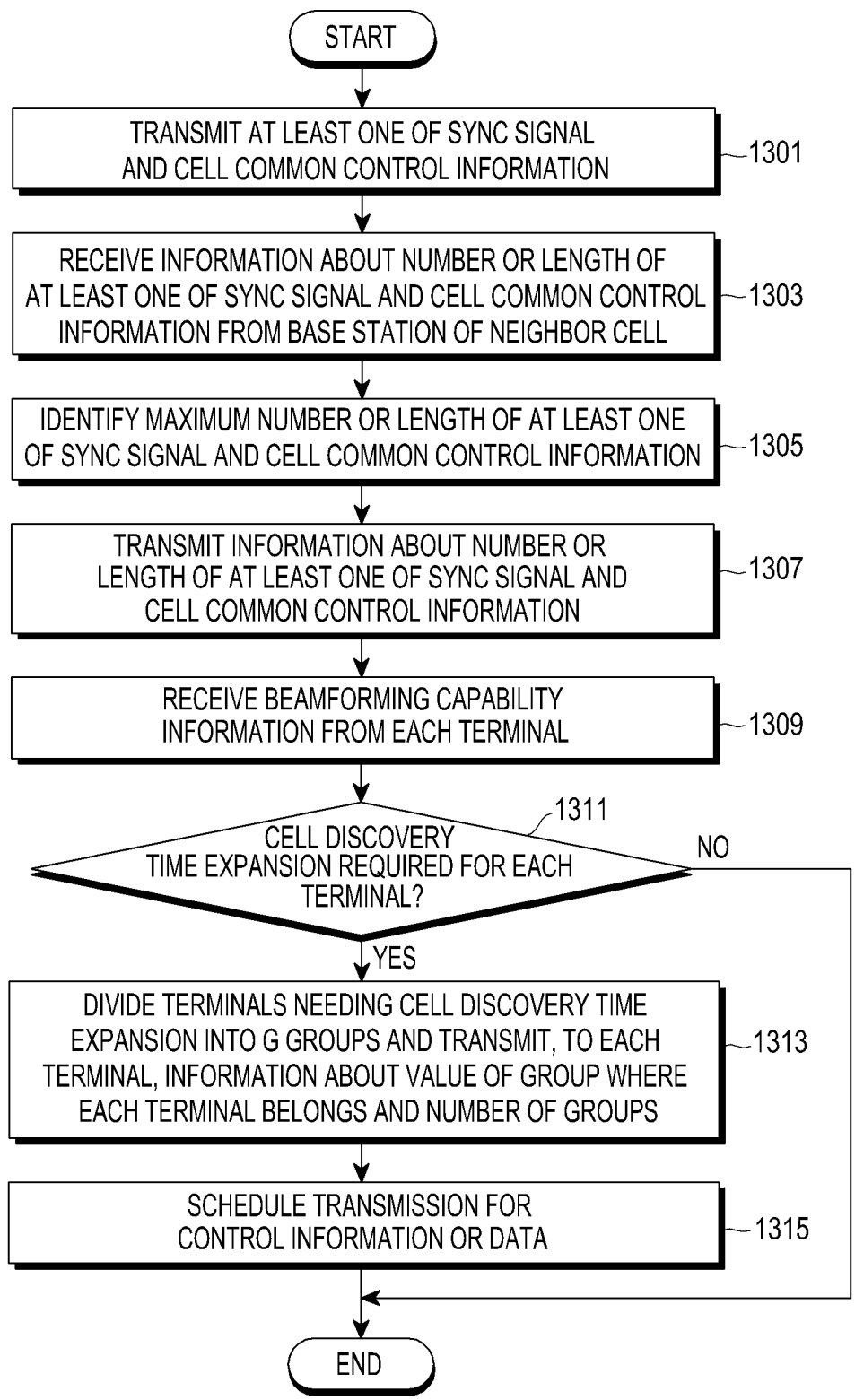
FIG. 13 is a view illustrating a method for performing cell discovery in a base station of a beamforming cellular communication system according to a first embodiment of the present invention.

FIG. 13 is a view illustrating a method for performing cell discovery in a base station of a beamforming cellular communication system according to a first embodiment of the present invention.

Referring to FIG. 13, the base station sends, at least once, at least one of a sync signal and cell common control information at a predetermined position of each frame while switching transmit beams (1301). In other words, the base station repeatedly sends sync signals or sync signals and cell common control information while switching transmit beams if necessary depending on the antenna structure or beamforming method and cell coverage of the base station so as to allow all the terminals in the cell to receive at least one of the sync signal and cell common control information.

The base station receives information about the length or number of sync signals or sync signal and cell common control information sent in each frame from the base station of the neighbor cell (1303). The information about the number or length may be provided through a network or may be information directly entered by the service provider. The base station of the neighbor cell may be the same or different type of base station from the base station of the serving cell.

The base station identifies the maximum number or length of the sync signals or sync signal and cell common control information from the information about the length and number received from the base station of the neighbor cell (1305).

The base station sends, to all the terminals in the cell, at least one of information about the number or length of the sync signals or sync signal and cell common control information sent from the base station, information about the identified maximum number or length of the sync signals or sync signal and cell common control information, and information about the larger of the information about the number or length of the sync signals or sync signal and cell common control information sent from the base station, information about the identified maximum number or length of the sync signals or sync signal and cell common control information (1307). At this time, the base station may broadcast information attempted to be sent to all the terminals as part of the cell common control information or send the same as individual control information to each terminal.

The base station receives information about the beamforming capability from all the terminals in its cell (1309). The information about the beamforming capability includes at least one of information about the antenna structure and beamforming method of the terminal and the total number of beams generated by the terminal, information about the number of beams generated simultaneously by the terminal, and information indicating whether the terminal may simultaneously generate beams in all directions or indicating whether a plurality of beam switches are required to transmit or receive signals in all directions since the terminal cannot simultaneously generate beams in all directions. Further, the base station may directly receive the information about the beamforming capability of each terminal from the terminal or may receive the same from the neighbor cell and base station through the network during a handover process.

The base station identifies the beamforming capability information received from each terminal and determines whether the cell discovery time needs to be expanded (1311). At this time, the base station may provide the determined information regarding whether to expand the cell discovery time to the terminal depending on system settings. Specifically, the base station determines that the cell discovery time for cell discovery need not be expanded for terminals capable of simultaneously generating beams in all directions. In case the maximum number or length of the sync signals or sync signal and cell common control information sent from the neighbor cell is larger than the maximum number or length of sync signals or sync signal and cell common control information sent from the base station, the base station determines that the cell discovery time need be expanded to the maximum number or length of the sync signals or sync signal and cell common control information sent from the neighbor cell for terminals capable of generating only one or a few beams at a time, but not all-directional beams simultaneously. At this time, the base station may expand the cell discovery time forward or backward as long a maximum inter-base station sync error as permitted in the standards. On the contrary, in case, although the maximum number or length of the sync signals or sync signal and cell common control information sent from the neighbor cell is the same or smaller than the number or length of the sync signals or sync signal and cell common control information sent from the serving cell base station, the terminal fails to receive all of the sync signals or sync signal and cell common control information from the neighbor cell due to a significant sync error between base stations, the base station determines that the cell discovery time needs to be expanded forward or backward as long a maximum inter-base station sync error as permitted in the standards for terminals capable of generating only one or several beams at a time, but not simultaneously all beams from all directions. Other than the situations set forth above, the base station determines that the terminal may perform cell discovery during the time of the sync signals or sync signal and cell common control information sent from the serving cell without the need to expand the cell discovery time.

Thereafter, the base station, in case there are terminals needing expansion of the cell discovery time, divide such terminals into G (G>1) groups and sends, to each terminal, information about the number G of the groups and the number g∈{0, 1, 2, . . . , G−1} of the group each terminal belongs to (1313). For example, the base station divides terminals needing expansion of cell discovery time into two (G=2) groups and send the number 0 or 1 of the group where each terminal belongs to the terminal. The number G of groups may be a fixed value, and in such case, the base station need not send the information about G to the terminal. Further, in case a rule for generating the group number g is defined in the standards, for example, in case, when some unique number (mobile station ID (MSID)) or radio network temporary ID (RNTI) is assigned to the terminal, g is agreed on to be a remainder of the value obtained by dividing the MSID or RNTI by G (g=MSID % G or g=RNTI % G), the base station may abstain from giving the information about the group number g to the terminal. The 3GPP standards define several types of RNTIs, among which cell RNTI (C-RNTI), as an example, may be used to generate the group number g.

The base station represents frame number f distinctively for the G groups, e.g., f=Gk+g (k=0, 1, 2, . . . ) and arranges a schedule so that no control information or data is transmitted during the expanded cell discovery time for the terminals whose group numbers are g in the frame numbers corresponding to group number g (1315). For example, in case G=2, the base station sets up a schedule not to send control signals or data for terminals whose group numbers g are 0 during the expanded cell discovery time in even-numbered frame numbers and not to send control signals or data for terminals with group number g=1 during the expanded cell discovery time in odd-numbered frame numbers. As another example, in case G=4, the base station makes a schedule to abstain from sending control signals or data for terminals whose group numbers are g during the expanded cell discovery time in frames f=4k+g (k=0, 1, 2, . . . ).

Meanwhile, the base station skips operations 1313 and 1315 for terminals for which the cell discovery time is determined not to be required.

Figure 14:
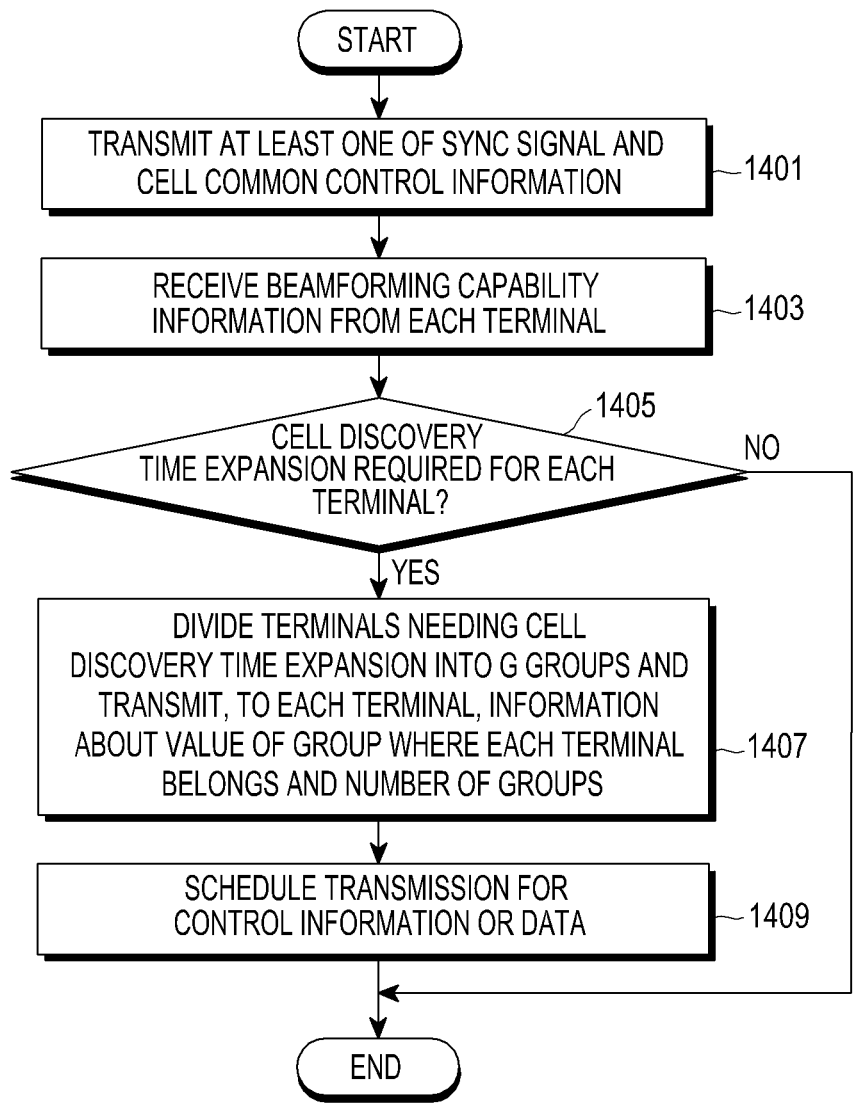
FIG. 14 is a view illustrating a method for performing cell discovery in a base station of a beamforming cellular communication system according to a second embodiment of the present invention.

FIG. 14 is a view illustrating a method for performing cell discovery in a base station of a beamforming cellular communication system according to a second embodiment of the present invention.

According to the second embodiment of the present invention, in case the maximum number or length of sync signals or sync signal and cell common control information sent from the base station is limited by the standards, the terminal may perform cell discovery based on the maximum length regardless of the number or length of sync signals or sync signal and cell common control information actually sent from the serving cell and neighbor cell. At this time, the base station need not receive information on the number or length of sync signals or sync signal and cell common control information from the base station of the neighbor cell nor does it need to send the information on the number or length of sync signals or sync signal and cell common control information to the terminal. Further, the base station may make an additional expansion for the cell discovery time as long a maximum inter-base station sync error as permitted in the standards. In particular, in the case of asynchronous systems which do not establish an inter-base station sync, the terminal may expand the cell discovery time to one frame to perform cell discovery.

Referring to FIG. 14, the base station sends, at least once, at least one of a sync signal and cell common control information at a predetermined position of each frame while switching transmit beams (1401). In other words, the base station repeatedly sends sync signals or sync signals and cell common control information while switching transmit beams if necessary depending on the antenna structure or beamforming method and cell coverage of the base station so as to allow all the terminals in the cell to receive at least one of the sync signal and cell common control information.

The base station receives information about the beamforming capability from all the terminals in its cell (1403). The information about the beamforming capability includes at least one of information about the antenna structure and beamforming method of the terminal and the total number of beams generated by the terminal, information about the number of beams generated simultaneously by the terminal, and information indicating whether the terminal may simultaneously generate beams in all directions or indicating whether a plurality of beam switches are required to transmit or receive signals in all directions since the terminal cannot simultaneously generate beams in all directions. Further, the base station may directly receive the information about the beamforming capability of each terminal from the terminal or may receive the same from the neighbor cell and base station through the network during a handover process.

The base station identifies the beamforming capability information received from each terminal and determines whether the cell discovery time needs to be expanded (1405). Specifically, the base station determines that the cell discovery time need not be expanded for terminals capable of simultaneously generating beams in all directions and that the cell discovery time need be expanded for all other terminals. The base station, if the cell discovery time needs expansion, may send information on the expansion of the cell discovery time to each terminal. The terminal requiring that the cell discovery time be expanded may conduct discovery based on the maximum length of sync signals or sync signal and cell common control information defined in the standards, and if necessary, carry out cell discovery with the maximum inter-base station sync error time, as permitted in the standards, added before and behind. In particular, asynchronous communication systems are capable of a one-frame expansion for the cell discovery time of terminal.

Thereafter, the base station, in case there are terminals needing expansion of the cell discovery time, divide such terminals into G (G>1) groups and sends, to each terminal, information about the number G of the groups and the number g∈{0, 1, 2, . . . , G−1} of the group each terminal belongs to (1407).

The base station divides frame numbers f into G groups and arranges a schedule so that no control information or data is transmitted during the expanded cell discovery time for the terminals whose group numbers are g in the frame numbers corresponding to group number g (1409).

Meanwhile, the base station skips operations 1407 and 1409 for terminals for which the cell discovery time is determined not to be required.

In the method of performing cell discovery on the base station, it may be enough to receive, only once per neighbor cell, information on the number or length of sync signals or sync signal and cell common control information sent per frame from the base station of the neighbor cell, and it may be enough to receive, only once per terminal, beamforming-related capability information for terminals belonging to its own cell (i.e., the serving cell). Further, the base station designates a group g of terminals needing a cell discovery time expansion only once per terminal and notifies the terminal. Instead, the base station abstains from allocating control signals or data resources to the terminals in group g in the expanded cell discovery time of each frame f=Gk+g.

The conventional process in which a terminal to send a request for a gap time for a neighbor cell measurement and a base station allocates a gap time consumes more control information and time than does a process according to the present invention, and setting up a gap time may deteriorate communication efficiency. In particular, as the cell discovery time according to an embodiment of the present invention, generally one or two slots, i.e., 50 us to 100 us, are enough for synchronous systems, and this is far shorter than the gap time in the conventional process, eliminating a deterioration of communication efficiency due to a cell discovery time expansion. Hence, a method of performing cell discovery on a base station according to an embodiment of the present invention is simpler and high efficient as compared with the conventional neighbor cell measurement method through a gap time.

Figure 15:
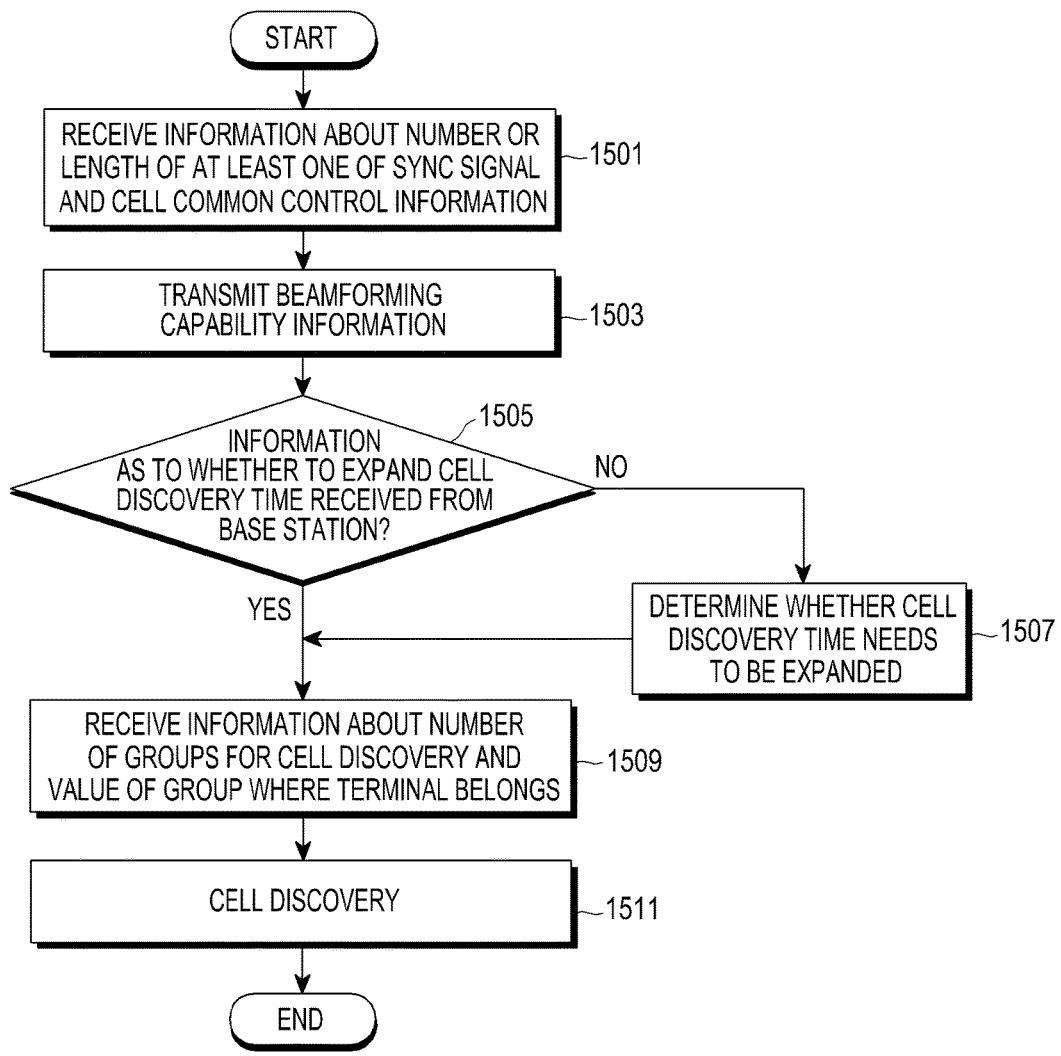
FIG. 15 is a view illustrating a method for performing cell discovery in a terminal of a beamforming cellular communication system according to the first embodiment of the present invention.

FIG. 15 is a view illustrating a method for performing cell discovery in a terminal of a beamforming cellular communication system according to the first embodiment of the present invention. The method for the terminal to perform cell discovery according to the first embodiment of the present invention as illustrated in FIG. 15 corresponds to the method for performing cell discovery on the base station according to the first embodiment of the present invention as illustrated in FIG. 13.

Referring to FIG. 15, the terminal receives, from the serving cell, at least one of information about the number or length of the sync signals or sync signal and cell common control information, information about the maximum number or length of the sync signals or sync signal and cell common control information, and information about the larger of the information about the number or length of the sync signals or sync signal and cell common control information, information about the identified maximum number or length of the sync signals or sync signal and cell common control information (1501). At this time, the terminal may receive the information about the number or length as a portion of cell common control information or as individual control information.

The terminal sends information about beamforming capability to the base station (1503). The information about the beamforming capability includes at least one of information about the antenna structure and beamforming method of the terminal and the total number of beams generated by the terminal, information about the number of beams generated simultaneously by the terminal, and information indicating whether the terminal may simultaneously generate beams in all directions or indicating whether a plurality of beam switches are required to transmit or receive signals in all directions since the terminal cannot simultaneously generate beams in all directions.

The terminal identifies whether information as to whether to expand cell discovery time has been received from the base station (1505). In case the terminal fails to receive the information as to whether to expand cell discovery time, the terminal itself determines whether a cell discovery time expansion is required (1507). Specifically, the terminal, if able to simultaneously generate beams in all directions, determines that no cell discovery time expansion is needed. In case the maximum number or length of the sync signals or sync signal and cell common control information received from the base station of the neighbor cell is larger than the number or length of sync signals or sync signal and cell common control information received from the base station of the serving cell, if the terminal is capable of generating only one or a few beams at a time, but not beams of all directions simultaneously. the terminal determines that the cell discovery time needs to be expanded to the maximum number or length of sync signals or sync signal and cell common control information received from the base station of the neighbor cell. Further, the terminal may determine that the cell discovery time needs to be expanded forward and backward as long a maximum inter-base station sync error as permitted in the standards. In case, although the maximum number or length of the sync signals or sync signal and cell common control information received from the base station of the neighbor cell is the same or smaller than the number or length of the sync signals or sync signal and cell common control information received from the base station of the serving cell base station, the terminal fails to receive all of the sync signals or sync signal and cell common control information from the neighbor cell due to a significant sync error between base stations, the terminal determines that the cell discovery time needs to be expanded forward or backward as long a maximum inter-base station sync error as permitted in the standards if the terminal is capable of generating only one or several beams at a time, but not simultaneously all beams from all directions. Other than the situations set forth above, the terminal may perform cell discovery during the time of the sync signals or sync signal and cell common control information received from the serving cell without the need to expand the cell discovery time.

In case the terminal needs an expansion of cell discovery time, the terminal receives group information about the number G (G>1) of groups for expanding cell discovery time and the number g∈{0, 1, 2, . . . , G−1} of the group where the terminal belongs (1509). In case G is a fixed value in the standards, the terminal might not receive G from the base station. Further, in case a rule for generating group number g is defined in the standards, the terminal does not receive the information about group number g from the base station.

Figure 16:
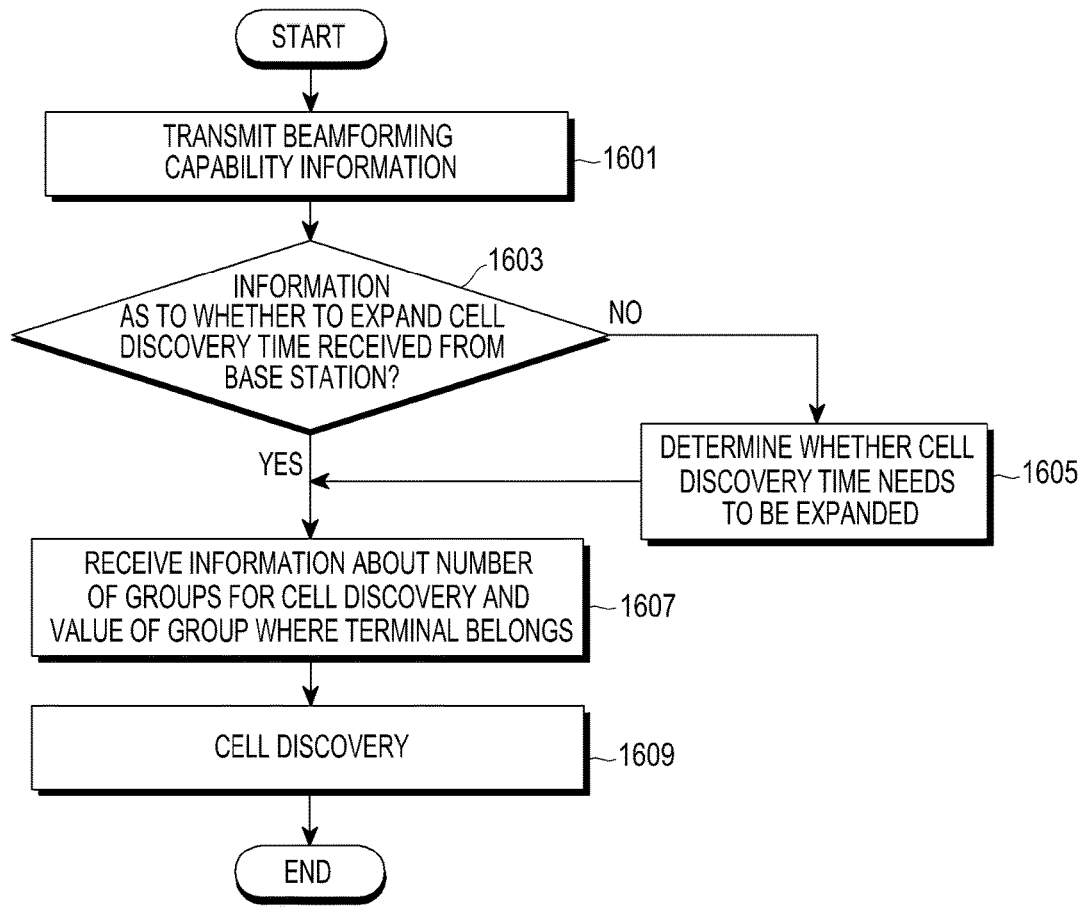
FIG. 16 is a view illustrating a method for performing cell discovery in a terminal of a beamforming cellular communication system according to the second embodiment of the present invention.

Next, the terminal discovers neighbor cells while receiving signals from the serving cell based on the received group information (1511). Specifically, in case the terminal needs an expansion of cell discovery time, the terminal represents frame number f distinctively for G groups, e.g., f=Gk+g (k=0, 1, 2, . . . ), and conducts cell discovery in the expanded cell discovery time and the time of sync signal or sync signal and cell common control information in the frame number corresponding to group number g. When the frame number f increases as follows: f=g, G+g, 2G+g, 3G+g, . . . , the terminal sequentially makes changes to the receive beam Brx_CS used for cell discovery, e.g., as follows: Brx_CS=0, 1, 2, 3, . . . . The terminal receives sync signal and cell common control information slots using the receive beam Brx_Opt optimal for the serving cell in other frame numbers to obtain a sync with the serving cell and additionally discover neighbor cells. For example, in case G=2, and the group number of the terminal is 0, the terminal performs cell discovery with the receive beam Brx_CS during the expanded cell discovery time and sync signal or sync signal and cell common control information slots in even-numbered frame numbers and receives signals in odd-numbered frame numbers through the receive beam Brx_Opt for the serving cell to obtain a sync with the serving cell and additionally discover neighbor cells. In contrast, in case the group number of the terminal is 1, the terminal performs cell discovery with the receive beam Brx_CS during the cell discovery time added or expanded and sync signal or sync signal and cell common control information slot in odd-numbered frame numbers and receives sync signal and cell common control information slots in even-numbered frame numbers through the receive beam Brx_Opt for the serving cell to obtain a sync with the serving cell and additionally discover neighbor cells. An exemplary operation of the terminal when G=2 is shown in Table 1 below.

cell discovery according to the second embodiment of the present invention as illustrated in FIG. 16 corresponds to the method for performing cell discovery on the base station according to the second embodiment of the present invention as illustrated in FIG. 14.

Referring to FIG. 16, the terminal sends beamforming-related capability information to the base station (1601). The beamforming-related capability information includes at least one of information about the antenna structure and beamforming method of the terminal and the total number of beams generated by the terminal, information about the number of beams generated simultaneously by the terminal, and information indicating whether the terminal may simultaneously generate beams in all directions or indicating whether a plurality of beam switches are required to transmit or receive signals in all directions since the terminal cannot simultaneously generate beams in all directions.

The terminal identifies whether information as to whether to expand cell discovery time has been received from the base station (1603). In case the terminal fails to receive the information as to whether to expand cell discovery time, the terminal itself determines whether a cell discovery time expansion is required (1605). Specifically, the terminal, if able to simultaneously generate beams in all directions, determines that no cell discovery time expansion is needed. In case the maximum number or length of the sync signals or sync signal and cell common control information received from the base station of the neighbor cell is larger than the number or length of sync signals or sync signal and cell common control information received from the base station of the serving cell, if the terminal is capable of generating only one or a few beams at a time, but not beams of all directions simultaneously. the terminal determines that the cell discovery time needs to be expanded to the maximum number or length of sync signals or sync signal and cell

TABLE 1

| | | | | | Frame | | | | |
|---|---|---|---|---|---|---|---|---|---|
| | Index | 0 | 1 | 2 | 3 | 4 | 5 | 6 | 7 |
| Group 0 | Rx Beam | Brx_CS = 0 | Brx_Opt | Brx_CS = 1 | Brx_Opt | Brx_CS = 2 | Brx_Opt | Brx_CS = 3 | Brx_Opt |
| | Rx Mode | CS | Sync/CS | CS | Sync/CS | CS | Sync/CS | CS | Sync/CS |
| Group 1 | Rx Beam | Brx_Opt | Brx_CS = 0 | Brx_Opt | Brx_CS = 1 | Brx_Opt | Brx_CS = 2 | Brx_Opt | Brx_CS = 3 |
| | Rx Mode | Sync/CS | CS | Sync/CS | CS | Sync/CS | CS | Sync/CS | CS |

On the contrary, terminals not requiring a cell discovery time expansion does not receives the group number g and discover neighbor cells during the time of sync signal and cell common control information sent from the serving cell. Terminals capable of simultaneously generating beams in all directions may always remain synced with the serving cell while simultaneously discovering neighbor cells. Further, terminals capable of generating only one or a few beams at a time, but not beams in all destination are required to differentiate between frames for syncing with the serving cell and frames for discovering neighbor cells, and in this case, the terminals carry out such without notifying the serving cell of the differentiation.

FIG. 16 is a view illustrating a method for performing cell discovery in a terminal of a beamforming cellular communication system according to the second embodiment of the present invention. The method for the terminal to perform common control information received from the base station of the neighbor cell. Further, the terminal may determine that the cell discovery time needs to be expanded forward and backward as long a maximum inter-base station sync error as permitted in the standards. In case, although the maximum number or length of the sync signals or sync signal and cell common control information received from the base station of the neighbor cell is the same or smaller than the number or length of the sync signals or sync signal and cell common control information received from the base station of the serving cell base station, the terminal fails to receive all of the sync signals or sync signal and cell common control information from the neighbor cell due to a significant sync error between base stations, the terminal determines that the cell discovery time needs to be expanded forward or backward as long a maximum inter-base station sync error as permitted in the standards if the terminal is capable of generating only one or several beams at a time, but not simultaneously all beams from all directions. Other than the situations set forth above, the terminal may perform cell discovery during the time of the sync signals or sync signal and cell common control information received from the serving cell without the need to expand the cell discovery time.

In case the terminal needs an expansion of cell discovery time, the terminal receives group information about the number G (G>1) of groups for expanding cell discovery time and the number g∈{0, 1, 2, ..., G−1} of the group where the terminal belongs (1509). In case G is a fixed value in the standards, the terminal might not receive G from the base station. Further, in case a rule for generating group number g is defined in the standards, the terminal does not receive the information about group number g from the base station.

Next, the terminal discovers neighbor cells while receiving signals from the serving cell based on the received cell discovery-related information (1609). Specifically, in case the terminal needs an expansion of cell discovery time, the terminal represents frame number f distinctively for G groups, e.g., f=Gk+g (k=0, 1, 2, ...), and conducts cell discovery in the expanded or added cell discovery time and the time of sync signal or sync signal and cell common control information in the frame number corresponding to group number g. When the frame number f increases as follows: f=g, G+g, 2G+g, 3G+g, ..., the terminal sequentially makes changes to the receive beam Brx_CS used for cell discovery, e.g., as follows: Brx_CS=0, 1, 2, 3, .... The terminal receives sync signal and cell common control information slots using the receive beam Brx_Opt optimal for the serving cell in other frame numbers to obtain a sync with the serving cell and additionally discover neighbor cells. For example, in case G=2, and the group number of the terminal is 0, the terminal performs cell discovery with the receive beam Brx_CS during the expanded or added cell discovery time and sync signal or sync signal and cell common control information slots in even-numbered frame numbers and receives signals in odd-numbered frame numbers through the receive beam Brx_Opt for the serving cell to obtain a sync with the serving cell and additionally discover neighbor cells. In contrast, in case the group number of the terminal is 1, the terminal performs cell discovery with the receive beam Brx_CS during the cell discovery time added or expanded and sync signal or sync signal and cell common control information slot in odd-numbered frame numbers and receives sync signal and cell common control information slots in even-numbered frame numbers through the receive beam Brx_Opt for the serving cell to obtain a sync with the serving cell and additionally discover neighbor cells. An exemplary operation of the terminal when G=2 is shown in Table 1 above.

Meanwhile, terminals capable of simultaneously generating beams in all directions do not need a cell discovery time expansion and may always remain synced with the serving cell while simultaneously discovering neighbor cells.

In the method for the terminal performing cell discovery on the base station, it may be enough to receive, only once per serving cell, information on the number or length of sync signals or sync signal and cell common control information sent per frame from the base station of the serving cell and the base station of the neighbor cell, and it may be enough to send, only once, its own beamforming-related capability information to the serving cell. Further, it may be enough to receive, only once per serving cell, information as to whether the terminal needs a cell discovery time expansion and information about group g where the terminal belongs. Instead, the terminal discovers neighbor cells in the expanded cell discovery time of each frame f=Gk+g. The process in which a terminal to send a request for a gap time for a neighbor cell measurement and is allocated a gap time in conventional mobile communication systems consumes more control information and time than does a process according to the present invention, and designating a gap time may deteriorate communication efficiency. Hence, the transmission and reception of control information for terminal's cell discovery and the terminal's operation according to an embodiment of the present invention are simpler and high efficient as compared with the conventional neighbor cell measurement method through a gap time.

Figure 17:
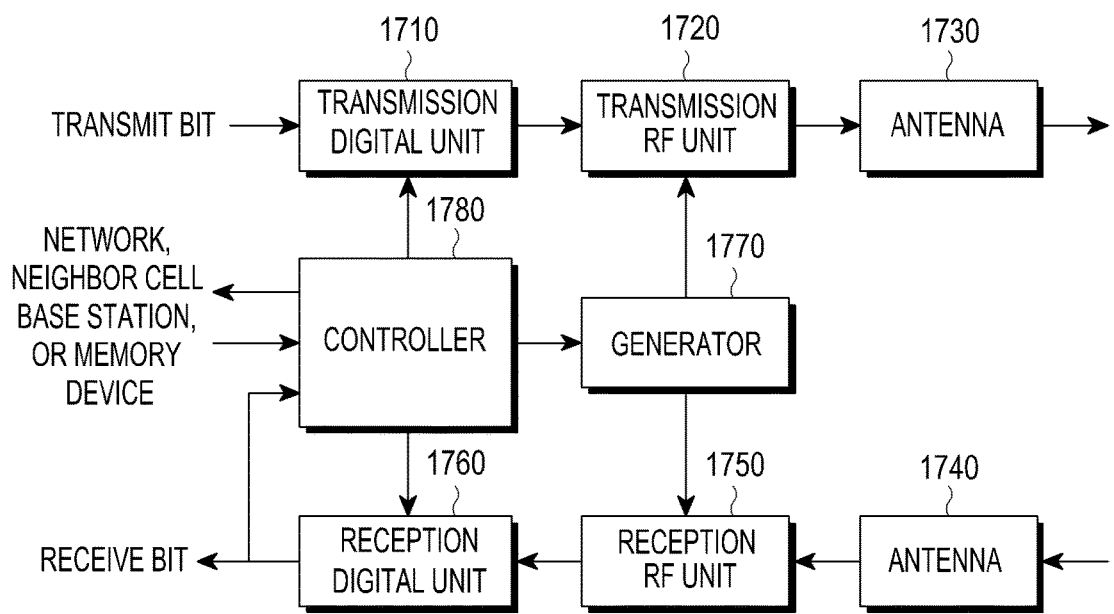
FIG. 17 is a view illustrating a configuration of an apparatus performing cell discovery in a base station of a beamforming cellular communication system according to an embodiment of the present invention.

FIG. 17 is a view illustrating a configuration of an apparatus performing cell discovery in a base station of a beamforming cellular communication system according to an embodiment of the present invention.

Referring to FIG. 17, the apparatus performing cell discovery in the base station includes a transmission digital unit 1710, a transmission RF unit 1720, a transmission antenna 1730, a reception antenna 1740, a reception RF unit 1750, a reception digital unit 1760, a generator 1770, and a controller 1780. The apparatus performing cell discovery in the base station as illustrated in FIG. 17 corresponds to each unit included in the transmitter and receiver shown in FIGS. 1 and 3, and operations of each unit have been described above in detail with reference to FIGS. 1 and 3, no detailed description of which is thus given.

The transmission digital unit 1710 includes L encoder units 102-1 to 102-L, L modulator units 104-1 to 104-L, a precoder unit 106, M IFFT units 108-1 to 108-M, and M digital to analogue converter (DAC) units 110-1 to 110-M, as illustrated in FIG. 1. The transmission digital unit 1710 receives transmission bit subject to transmission, and each units performs a corresponding operation on the received transmission bits to output analog bits.

The transmission RF unit 1720 includes M RF units 112-1 to 112-M as illustrated in FIG. 1, receives the frequency and phase of analog bits from the transmission digital unit 1710, converts the received analog bits into a desired frequency and phase, and amplifies the converted signals through a high power amplifier.

The transmission antenna 1730 includes M antenna array units 114-1 to 114-M as illustrated in FIG. 1 and sends the amplified signals to a terminal.

In particular, according to an embodiment of the present invention, the transmission digital unit 1710 sends various control signals and data regarding the terminal, particularly a sync signal or sync signal and cell common control information, through the transmission RF unit 1720 and the transmission antenna 1730.

The reception antenna 1740 includes M antenna array units 302-1 to 302-M as illustrated in FIG. 3 and receives signals from the terminal.

The reception RF unit 1750 includes M RF units 304-1 to 304-M as illustrated in FIG. 3, converts the phase of the received signals, add the phase-converted signals, and converts the frequency of the added signals into a desired frequency.

The reception digital unit 1760 includes M ADC units 306-1 to 306-M, M FFT units 308-1 to 308-M, a beamforming unit 310, L demodulator units 312-1 to 312-L, and L decoder units 314-1 to 314-L. The reception digital unit 1760 receives the signals with the frequency converted into a desired one from the reception RF unit 1750, and each unit performs a corresponding operation on the received signals to output decoded signals.

The generator 1770 generates phase-converted values corresponding to transmit analog beams and receive analog beams and transfers the generated phase-converted values to the RF units 1720 and the reception RF unit 1750, respectively, to support analog beamforming. However, no phase converter may be needed in the transmission RF unit 1720 and the reception RF unit 1750 depending on the beamforming structure of base station, and in such case, the base station does not include the generator 1770.

The controller 1780 controls digital transmit beamforming of the transmission digital unit 1710 and digital receive beamforming of the reception digital unit 1760 and controls analog beamforming of the transmission RF unit 1720 and the reception RF unit 1750 through the generator 1770. Further, the controller 1780 controls operations for performing cell discovery as per the first and second embodiment of the present invention as illustrated in FIGS. 13 and 14. The controller 1780 may be implemented in hardware or software to be run on a DSP or CPU or may be implemented partially in hardware and partially in software.

Specifically, the controller 1780 controls the following operations according to the first embodiment of the present invention. The controller 1780 selects and controls digital and analog transmit beams for various control signals and data subject to transmission to the terminal and selects and controls digital and analog transmit beams for sync signals or sync signal and cell common control information. The controller 1780 receives information about the number or length of sync signals or sync signal and cell common control information sent from the base station of a neighbor cell from the network or the base station of the neighbor cell or receives the information about the number or length from a memory device in the base station previously retaining the information about the number or length. The controller 1780 identifies the maximum number or length of the sync signals or sync signal and cell common control information from the received information about the number or length. The controller 1780 transfers, to the transmission digital unit 1710 to thereby be sent to all the terminals in the cell, at least one of information about the number or length of the sync signals or sync signal and cell common control information sent from the base station, information about the identified maximum number or length of the sync signals or sync signal and cell common control information, and information about the larger of the information about the number or length of the sync signals or sync signal and cell common control information sent from the base station, information about the identified maximum number or length of the sync signals or sync signal and cell common control information. The controller 1780 receives information about a beamforming capability. Here, as a method for the controller 1780 to receive the beamforming capability information, the controller 1780 may detect the beamforming capability information from a signal received from the terminal through the reception digital unit 1760 or receive the beamforming capability information from the network or the base station of the neighbor cell during a handover process. The controller 1780 identifies the beamforming capability information received per terminal, determines whether the cell discovery time needs to be expanded, and as necessary, transfers the determined information as to whether the cell discovery time needs to be expanded to the transmission digital unit 1710 to notify the terminal. Here, methods for determining whether the cell discovery time needs to be expanded have been described above in detail with reference to FIG. 13, no detailed description of which is given further. The controller 1780, in case there are terminals needing expansion of the cell discovery time, divide such terminals into G (G>1) groups and transfers, to the transmission digital unit 170 to thereby be sent to each terminal, information about the number G of the groups and the number g∈{0, 1, 2, . . . , G−1} of the group each terminal belongs to. The controller 1780 represents frame number f distinctively for the G groups, e.g., f=Gk+g (k=0, 1, 2, . . . ) and arranges a schedule so that no control information or data is transmitted during the expanded cell discovery time for the terminals whose group numbers are g in the frame numbers corresponding to group number g. In contrast, the controller 1780 does not limit scheduling for transmission of control signals or data to support a cell discovery operation or divide into groups for terminals for which a cell discovery time expansion is determined not to be needed.

Further, the controller 1780 controls the following operations according to the second embodiment of the present invention. The controller 1780 selects and controls digital and analog transmit beams for various control signals and data subject to transmission to the terminal and selects and controls digital and analog transmit beams for sync signals or sync signal and cell common control information. The controller 1780 receives information about a beamforming capability. Here, as a method for the controller 1780 to receive the beamforming capability information, the controller 1780 may detect the beamforming capability information from a signal received from the terminal through the reception digital unit 1760 or receive the beamforming capability information from the network or the base station of the neighbor cell during a handover process. The controller 1780 identifies the beamforming capability information received per terminal, determines whether the cell discovery time needs to be expanded, and as necessary, transfers the determined information as to whether the cell discovery time needs to be expanded to the transmission digital unit 1710 to notify the terminal. Here, methods for determining whether the cell discovery time needs to be expanded have been described above in detail with reference to FIG. 14, no detailed description of which is given further. The controller 1780, in case there are terminals needing expansion of the cell discovery time, divide such terminals into G (G>1) groups and transfers, to the transmission digital unit 170 to thereby be sent to each terminal, information about the number G of the groups and the number g∈{0, 1, 2, . . . , G−1} of the group each terminal belongs to. The controller 1780 represents frame number f distinctively for the G groups, e.g., f=Gk+g (k=0, 1, 2, . . . ) and arranges a schedule so that no control information or data is transmitted during the expanded cell discovery time for the terminals whose group numbers are g in the frame numbers corresponding to group number g. In contrast, the controller 1780 does not limit scheduling for transmission of control signals or data to support a cell discovery operation or divide into groups for terminals for which a cell discovery time expansion is determined not to be needed.

Figure 18:
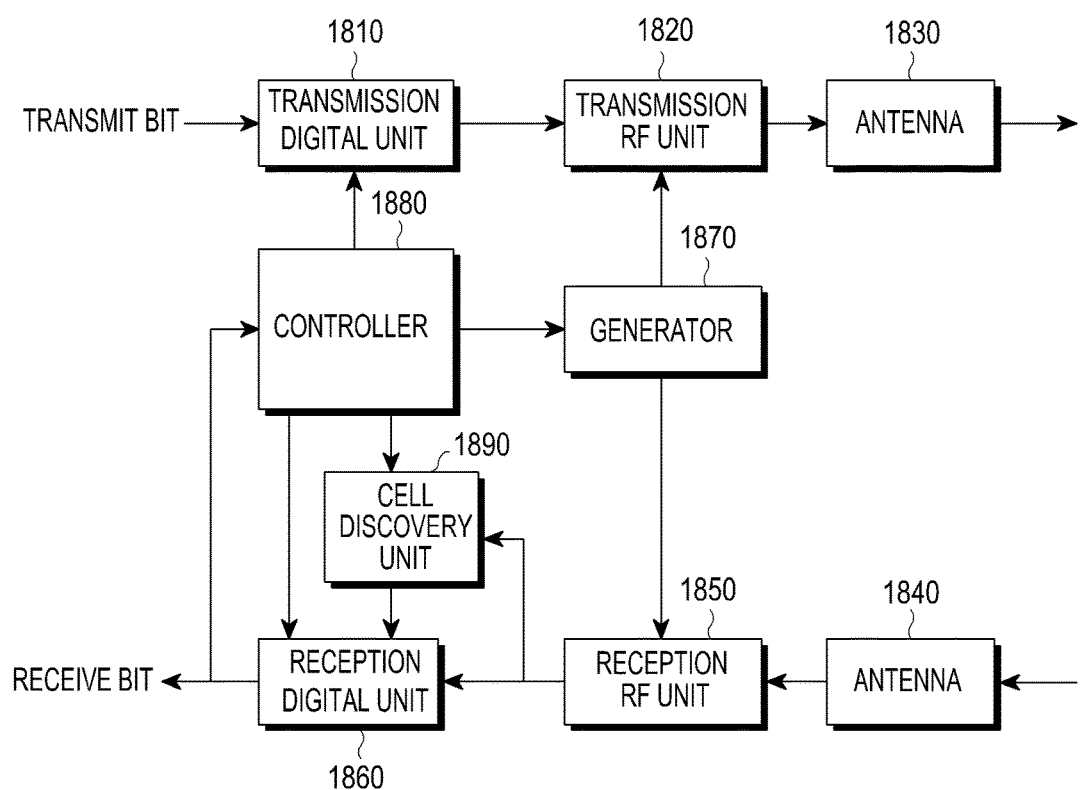
FIG. 18 is a view illustrating a configuration of an apparatus performing cell discovery in a terminal of a beamforming cellular communication system according to an embodiment of the present invention.

FIG. 18 is a view illustrating a configuration of an apparatus performing cell discovery in a terminal of a beamforming cellular communication system according to an embodiment of the present invention.

Referring to FIG. 18, the apparatus performing cell discovery in the terminal includes a transmission digital unit 1810, a transmission RF unit 1820, a transmission antenna 1830, a reception antenna 1840, a reception RF unit 1850, a reception digital unit 1860, a generator 1870, a controller

1890, and a cell discovery unit 1890. The apparatus performing cell discovery in the terminal as illustrated in FIG. 18 corresponds to each unit included in the transmitter and receiver shown in FIGS. 1 and 3, and operations of each unit have been described above in detail with reference to FIGS. 1 and 3, no detailed description of which is thus given.

The transmission digital unit 1810 includes L encoder units 102-1 to 102-L, L modulator units 104-1 to 104-L, a precoder unit 106, M IFFT units 108-1 to 108-M, and M DAC units 110-1 to 110-M, as illustrated in FIG. 1. The transmission digital unit 1810 receives transmission bit subject to transmission, and each units performs a corresponding operation on the received transmission bits to output analog bits.

The transmission RF unit 1820 includes M RF units 112-1 to 112-M as illustrated in FIG. 1, receives the frequency and phase of analog bits from the transmission digital unit 1810, converts the received analog bits into a desired frequency and phase, and amplifies the converted signals through a high power amplifier.

The transmission antenna 1830 includes M antenna array units 114-1 to 114-M as illustrated in FIG. 1 and sends the amplified signals to a base station.

The reception antenna 1840 includes M antenna array units 302-1 to 302-M as illustrated in FIG. 3 and receives sync signals or sync signal and cell common control information from the base station.

The reception RF unit 1850 includes M RF units 304-1 to 304-M as illustrated in FIG. 3, converts the phase of the received signals, add the phase-converted signals, and converts the frequency of the added signals into a desired frequency.

The reception digital unit 1860 includes M ADC units 306-1 to 306-M, M FFT units 308-1 to 308-M, a beamforming unit 310, L demodulator units 312-1 to 312-L, and L decoder units 314-1 to 314-L. The reception digital unit 1860 receives the signals with the frequency converted into a desired one from the reception RF unit 1850, and each unit performs a corresponding operation on the received signals to output decoded signals.

The generator 1870 generates phase-converted values corresponding to transmit analog beams and receive analog beams and transfers the generated phase-converted values to the RF units 1820 and the reception RF unit 1850, respectively, to support analog beamforming. However, no phase converter may be needed in the transmission RF unit 1820 and the reception RF unit 1850 depending on the beamforming structure of terminal, and in such case, the base station does not include the generator 1870.

The cell discovery unit 1890 receives sync signals or sync signal and cell common control information from the serving cell and neighbor cell through the reception RF unit 1850 and performs cell discovery to detect cells and obtain a sync.

The controller 1880 controls digital transmit beamforming of the transmission digital unit 1810 and digital receive beamforming of the reception digital unit 1860 and controls analog beamforming of the transmission RF unit 1820 and the reception RF unit 1850 through the generator 1870. Further, the controller 1880 controls operations for performing cell discovery as per the first and second embodiment of the present invention as illustrated in FIGS. 15 and 16. The controller 1880 may be implemented in hardware or software to be run on a DSP or CPU or may be implemented partially in hardware and partially in software.

Specifically, the controller 1880 controls the following operations according to the first embodiment of the present invention. The controller 1880 receives, through the reception digital unit 1860, at least one of information about the number or length of the sync signals or sync signal and cell common control information sent from the serving cell, information about the maximum number or length of the sync signals or sync signal and cell common control information, and information about the larger of the information about the number or length of the sync signals or sync signal and cell common control information, information about the identified maximum number or length of the sync signals or sync signal and cell common control information. The controller 1880 sends the beamforming capability information to the transmission digital unit 1810 to be then sent to the base station. The information about the beamforming capability includes at least one of information about the antenna structure and beamforming method of the terminal and the total number of beams generated by the terminal, information about the number of beams generated simultaneously by the terminal, and information indicating whether the terminal may simultaneously generate beams in all directions or indicating whether a plurality of beam switches are required to transmit or receive signals in all directions since the terminal cannot simultaneously generate beams in all directions. The controller 1880 receives information as to whether the cell discovery time is expanded through the reception digital unit 1860 from the base station or determines whether the cell discovery time needs to be expanded. Here, methods for determining whether the cell discovery time needs to be expanded have been described above in detail with reference to FIG. 15, no detailed description of which is given further. In case the cell discovery time needs to be expanded, the controller 1880 receives, through the reception digital unit 1860 from the base station, group information about the number G (G>1) of groups for expanding cell discovery time and the number g∈{0, 1, 2, . . . , G−1} of the group where the terminal belongs. Here, in case G is a fixed value as per the standards, the controller 1880 uses the fixed value specified in the standards rather than receiving the G value from the reception digital unit 1860. In case a rule for generating group number g is specified in the standards, the controller 1880 generates information about group number g, not receiving from the reception digital unit 1860. In case the cell discovery time needs to be expanded as based on the group information, the controller 1880 controls the cell discovery unit 1890 and generator 1870 so that cell discovery may be carried out during the expanded cell discovery time. In contrast, in case as based on the group information the cell discovery time need not be expanded, the controller 1880 controls the cell discovery unit 1890 and the generator 1870 so that cell discovery may be performed during the time of the sync signal or sync signal and cell common control information sent from the serving cell. At this time, in case beams in all directions may be generated simultaneously, the cell discovery unit 1890 may always remain synced with the serving cell while simultaneously discovering neighbor cells. Further, in case only one or a few beams may be generated at a time, but not beams in all destination simultaneously, the cell discovery unit 1890 is required to differentiate between frames for syncing with the serving cell and frames for discovering neighbor cells, and in this case, it carries out such without notifying the serving cell of the differentiation.

Further, the controller 1880 controls the following operations according to the second embodiment of the present invention. The controller 1880 sends the beamforming capability information to the transmission digital unit 1810 to be then sent to the base station. The controller 1880 receives information as to whether the cell discovery time is expanded through the reception digital unit 1860 from the base station or determines whether the cell discovery time needs to be expanded. Here, methods for determining whether the cell discovery time needs to be expanded have been described above in detail with reference to FIG. 16, no detailed description of which is given further. In case the cell discovery time needs to be expanded, the controller 1880 receives, through the reception digital unit 1860 from the base station, group information about the number G (G>1) of groups for expanding cell discovery time and the number g∈{0, 1, 2, . . . , G−1} of the group where the terminal belongs. Here, in case G is a fixed value as per the standards, the controller 1880 uses the fixed value specified in the standards rather than receiving the G value from the reception digital unit 1860. In case a rule for generating group number g is specified in the standards, the controller 1880 generates information about group number g, not receiving from the reception digital unit 1860. In case the cell discovery time needs to be expanded as based on the group information, the controller 1880 controls the cell discovery unit 1890 and generator 1870 so that cell discovery may be carried out during the expanded cell discovery time. That is, in case the cell discovery time needs to be expanded, the controller 1880 controls the cell discovery unit 1890 and the generator 1870 to represent frame number f distinctively for G groups, e.g., f=Gk+g (k=0, 1, 2, . . . ), and conduct cell discovery in the expanded cell discovery time and the time of sync signal or sync signal and cell common control information in the frame number corresponding to group number g. In contrast, in case the cell discovery time need not be expanded, the controller 1880 controls the cell discovery unit 1890 and the generator 1870 so that cell discovery may be performed during the time of the sync signal or sync signal and cell common control information sent from the serving cell.

As set forth above, there is provided efficient cell discovery by a terminal in a beamforming cellular communication system according to an embodiment of the present invention. That is, the conventional process in which a terminal to send a request for a gap time for a neighbor cell measurement and a base station allocates a gap time consumes more control information and time than does a process according to the present invention, and setting up a gap time may deteriorate communication efficiency. In particular, as the cell discovery time according to an embodiment of the present invention, generally one or two slots, i.e., 50 us to 100 us, are enough for synchronous systems, and this is far shorter than the gap time in the conventional process, eliminating a deterioration of communication efficiency due to a cell discovery time expansion. Hence, a method of performing cell discovery on a base station according to an embodiment of the present invention is simpler and high efficient as compared with the conventional neighbor cell measurement method through a gap time.

Further, according to an embodiment of the present invention, the base station of the serving cell determines whether the cell discovery time needs to be expanded for the terminal, designates, once, a group g value for cell discovery, and notifies the terminal. Since it is enough for each cell to receive, only once, information about the number or length of sync signals or sync signal and cell common control information from neighbor cells according to an embodiment of the present invention, waste due to exchange of information between cells is not caused. Further, according to an embodiment of the present invention, it is sufficient for each serving cell to receive, only once, beamforming capability information as to the terminal belonging to the serving cell. The beamforming capability information is provided from the terminal to communicate with the serving cell when the terminal first accesses the wireless network or transferred from a neighbor cell when the terminal hands over to the neighbor cell. In particular, the beamforming capability information is information that is supposed to be received for communication between the terminal and the serving cell, but is not additional information necessary for cell discovery according to an embodiment of the present invention. According to an embodiment of the present invention, the number G of cell discovery groups may be rendered to be a fixed value in the standards, and in this case, the base station need not give the same to the terminal. Even when G is not a fixed value, it is enough for the terminal to receive the value from each cell. Further, in case a rule for generating the group number g is defined in the standards, for example, in case, when some unique number is assigned to the terminal, g is agreed on to be a remainder of the value obtained by dividing the MSID or RNTI by G, the base station need not give the information about the group number g to the terminal.

According to an embodiment of the present invention, the terminal may perform cell discovery by receiving all information necessary for cell discovery once it receives information regarding the cell discovery time expansion, and if necessary, the g and G value. These values are fixed ones, rather than varying in the given cell from time to time, advantageously simplifying hardware implementations and operations for the cell discovery unit. As contrasted, conventional gap time-based cell measurement techniques may oftentimes allocate and release gap times and cause frequent changes to the gap time and period under the conditions of the terminal and base station, forcing the cell measurement apparatuses for terminals to be implemented to operate in a very flexible way.

Further, the beamforming cellular communication system according to an embodiment of the present invention does not limit the antenna structure or beamforming method available to the base station. Thus, even when the time length for sync signals and cell common information allocated to each cell is not limited to one, the terminal may secure a cell sync and discover neighbor cells without any trouble in communicating with the serving cell.

Further, the beamforming cellular communication system according to an embodiment of the present invention adopts different antenna structures or beamforming methods for use in base stations. Accordingly, although sync signals and cell common information allocated to a plurality of cells positioned adjacent to each other do not comply with each other, the terminal may obtain a sync with the serving cell and discover neighbor cells without any trouble in communicating with the serving cell.

Further, the terminal may have a different optimal beamforming method and antenna structure depending on its price or type. In the beamforming cellular communication system according to an embodiment of the present invention, even if various types of terminals of different antenna structures or beamforming methods co-exist in the same cell, the terminals may discover neighbor cells without raising any problem in communicating with the serving cell.

Further, in the beamforming cellular communication system according to an embodiment of the present invention, even in cases where the time periods of sync signals or sync signal and cell common control information sent from a plurality of neighboring cells substantially depart off due to a significant inter-base station sync error, the terminal may sync with the serving cell and discover neighbor cells free of troubles when communicating with the serving cell.

Further, according to an embodiment of the present invention, a cell discovery means may be provided for asynchronous communication systems. In particular, since the cell discovery method and operation for asynchronous communication systems are the same as those for synchronous communication systems, the base station and terminal according to an embodiment of the present invention may commonly use one cell discovery unit and controller for both a synchronous system and asynchronous system.

Although specific embodiments of the present invention have been described above, various changes may be made thereto without departing from the scope of the present invention. Thus, the scope of the present invention should not be limited to the above-described embodiments, and should rather be defined by the following claims and equivalents thereof.

The invention claimed is:

1. A method for performing cell discovery by a base station of a serving cell in a cellular communication system, the method comprising:
receiving information about at least one of a sync signal or common control information from a base station of a neighbor cell;
determining whether a cell discovery time needs to be expanded, based on at least one of a sync signal transmitted from the base station of the neighbor cell and a sync signal of the base station of the serving cell, or common control information transmitted from the base station of the neighbor cell and common control information of the base station of the serving cell;
determining group information about the cell discovery to at least one terminal needing the cell discovery time to be expanded; and
performing, based on the group information, scheduling on the at least one terminal,
wherein a transmission of control information or data, to the at least one terminal, is muted during a time expanded from the cell discovery time, based on the scheduling.

2. The method of claim 1, further comprising:
receiving information about a beamforming capability of each of the at least one terminal; and
determining whether the cell discovery time needs to be expanded based on the received information about the beamforming capability per terminal,
wherein the information about the beamforming capability includes at least one of an antenna structure of a terminal, a beamforming method, information about a total number of beams generated by the terminal, information about a number of beams simultaneously generated by the terminal, or information indicating whether the terminal can simultaneously generate beams in all directions or needs a plurality of beam switching.

3. The method of claim 2, wherein the information about the beamforming capability is received from each of the at least one terminal or the base station of the neighbor cell.

4. The method of claim 1, further comprising: transmitting the at least one of the sync signal and the common control information to the at least one terminal, by using at least one beam.

5. The method of claim 4, further comprising:
receiving information about a number or length of at least one of sync signals and common control information transmitted in each frame from the base station of the neighbor cell;
identifying a maximum number or length of at least one of the sync signal and common control information from the received information about the number or length; and
transmitting, to the at least one terminal, at least one of the information about the number or length of at least one of the sync signal and common control information transmitted from the base station of the serving cell, information about the identified maximum number or length, or information about a larger of the information about the number or length of at least one of the sync signal and common control information transmitted from the base station of the serving cell and information about the identified maximum number or length.

6. The method of claim 2, wherein the determining comprises:
if the at least one terminal can simultaneously generate beams in all directions, determining that the cell discovery time does not need to be expanded;
if a maximum number or length of at least one of a sync signal and common control information transmitted from the base station of a neighbor cell is larger than a number or length of at least one of a sync signal and common control information transmitted from the base station of the serving cell, and the at least one terminal cannot simultaneously generate beams in all directions but only one or few beams at a time, determining that the cell discovery time needs to be expanded to the maximum number or length of at least one of the sync signal and common control information transmitted from the base station of the neighbor cell; and
if, although the maximum number or length of at least one of the sync signal and common control information transmitted from the base station of the neighbor cell is the same or smaller than the number or length of at least one of the sync signal and common control information transmitted from the base station of the serving cell, the at least one terminal fails to receive at least one of the sync signal and common control information transmitted from the base station of the neighbor cell due to a significant difference in sync error between the base station of the serving cell and the base station of the neighbor cell, and the at least one terminal cannot simultaneously generate beams in all directions but only one or a few beams at a time, determining that the cell discovery time needs to be expanded as long as a predetermined maximum sync error.

7. The method of claim 1, further comprising:
dividing at least one terminal needing the cell discovery time to be expanded into a predetermined number of groups; and
transmitting, to the at least one terminal, at least one of a number of a group where the at least one terminal belongs or the group number.

8. The method of claim 7, wherein the group number is a remainder of a value obtained by dividing a unique number of the at least one terminal by the number of the groups.

9. The method of claim 8, wherein the unique number is a mobile station ID or a radio network temporary ID.

10. The method of claim 1, further comprising: performing scheduling on the at least one terminal so that no control information or data is transmitted during a full frame time.

11. The method of claim 1, further comprising: performing scheduling on the at least one terminal so that no control information or data is transmitted during a time corresponding to the number or length of at least one of a predetermined maximum sync signal or sync signal and common control information.

12. A method for performing cell discovery by a terminal in a cellular communication system, the method comprising:
identifying whether a cell discovery time needs to be expanded;
if the cell discovery time needs to be expanded, receiving group information about the cell discovery from a base station of a serving cell; and
discovering a neighbor cell in a frame corresponding to a group number included in the group information,
wherein the whether the cell discovery time needs to be expanded is determined based on at least one of a sync signal transmitted from the a station of the neighbor cell and a sync signal of the base station of the serving cell, or common control information transmitted from the base station of the neighbor cell and common control information of the base station of the serving cell,
wherein a transmission of control information or data, from the base station of the serving cell, is muted during a time expanded from the cell discovery time, based on the scheduling.

13. The method of claim 12, further comprising:
transmitting information about a beamforming capability;
wherein the whether the cell discovery time needs to be expanded is determined based on the beamforming capability, and
wherein the information about the beamforming capability includes at least one of an antenna structure of a terminal, a beamforming method, information about a total number of beams generated by the terminal, information about a number of beams simultaneously generated by the terminal, or information indicating whether the terminal can simultaneously generate beams in all directions or needs a plurality of beam switching.

14. The method of claim 12, further comprising:
receiving the at least one of the sync signal and the common control information from the base station of the serving cell, by using at least one beam.

15. The method of claim 12, further comprising:
receiving, from the base station of the serving cell, at least one of information about a number or length of at least one of a sync signal and common control information transmitted from the base station of the serving cell, a maximum number or length of at least one of a sync signal and common control information transmitted from a base station of a neighbor cell, or information about a larger of the information about the number or length of at least one of the sync signal and common control information transmitted from the base station of the serving cell and the maximum number.

16. The method of claim 12, wherein the identifying comprises:
receiving information indicating whether the cell discovery time needs to be expanded from the base station of the serving cell; and
identifying whether the cell discovery time needs to be expanded from the information indicating whether the cell discovery time needs to be expanded.

17. The method of claim 13, wherein the identifying comprises:
if the terminal can simultaneously generate beams in all directions, determining that the cell discovery time does not need to be expanded,
if a maximum number or length of at least one of a sync signal and common control information transmitted from the base station of the neighbor cell is larger than a number or length of at least one of a sync signal and common control information transmitted from the base station of the serving cell, and the terminal cannot simultaneously generate beams in all directions but only one or few beams at a time, determining that the cell discovery time needs to be expanded to the maximum number or length of at least one of the sync signal and common control information transmitted from the base station of the neighbor cell, and
if, although the maximum number or length of at least one of the sync signal and common control information transmitted from the base station of the neighbor cell is the same or smaller than the number or length of at least one of the sync signal and common control information transmitted from the base station of the serving cell, the terminal fails to receive at least one of the sync signal and common control information transmitted from the base station of the neighbor cell due to a significant difference in sync error between the base station of the serving cell and the base station of the neighbor cell, and the terminal cannot simultaneously generate beams in all directions but only one or a few beams at a time, determining that the cell discovery time needs to be expanded as long as a predetermined maximum sync error.

18. The method of claim 12, wherein the group information includes at least one of a number of groups into which at least one terminal needing the cell discovery time to be expanded is divided and a number of a group where the terminal belongs.

19. The method of claim 18, wherein the group number is a remainder of a value obtained by dividing a unique number of the terminal by the number of the groups.

20. The method of claim 19, wherein the unique number is a mobile station ID or a radio network temporary ID.

21. A base station of a serving cell for performing cell discovery in a cellular communication system, the base station comprising:
a transceiver configured to receive information about at least one of a sync signal and common control information from a base station of a neighbor cell; and
a controller configured to:
determine whether a cell discovery time needs to be expanded, based on at least one of a sync signal transmitted from the base station of the neighbor cell and a sync signal of the base station of the serving cell, or common control information transmitted from the base station of the neighbor cell and common control information of the base station of the serving cell,
determine group information about the cell discovery to a terminal needing the cell discovery time to be expanded, and
perform, based on the group information, scheduling on the at least one terminal,
wherein a transmission of control information or data, to the at least one terminal, is muted during a time expanded from the cell discovery time, based on the scheduling.

22. The base station of claim 21, wherein the controller further configured to:

receive information about a beamforming capability of each of all of terminals in a cell; and determine whether the cell discovery time needs to be expanded based on the received information about the beamforming capability per terminal, wherein the information about the beamforming capability includes at least one of an antenna structure of a terminal, a beamforming method, information about a total number of beams generated by the terminal, information about a number of beams simultaneously generated by the terminal, and information indicating whether the terminal can simultaneously generate beams in all directions or needs a plurality of beam switches.

23. The base station of claim 22, wherein the information about the beamforming capability is received from each of the terminals or the base station of the neighbor cell.

24. The base station of claim 21, wherein the controller is further configured to transmit the at least one of the sync signal and the common control information to all of the terminals, by using at least one beam.

25. The base station of claim 24, wherein the controller further configured to:
upon receiving at least one of the information about a number or length of at least one of the sync signal and common control information transmitted in each frame from a base station of a neighbor cell, identify a maximum number or length of at least one of the sync signal and common control information from the received information about the number or length; and
control the transceiver to transmit, to the at least one terminal, at least one of the information about the number or length of at least one of the sync signal and common control information transmitted from the base station of the serving cell, information about the identified maximum number or length, or information about a larger of the information about the number or length of at least one of the sync signal and common control information transmitted from the base station of the serving cell and information about the identified maximum number or length.

26. The base station of claim 21, wherein the controller is further configured to:
if the at least one terminal can simultaneously generate beams in all directions, determine that the cell discovery time does not need to be expanded,
if a maximum number or length of at least one of a sync signal and common control information transmitted from the base station of a neighbor cell is larger than a number or length of at least one of a sync signal and common control information transmitted from the base station of the serving cell, and the at least one terminal cannot simultaneously generate beams in all directions but only one or few beams at a time, determine that the cell discovery time needs to be expanded to the maximum number or length of at least one of the sync signal and common control information transmitted from the base station of the neighbor cell, and
if, although the maximum number or length of at least one of the sync signal and common control information transmitted from the base station of the neighbor cell is the same or smaller than the number or length of at least one of the sync signal and common control information transmitted from the base station of the serving cell, the at least one terminal fails to receive at least one of the sync signal and common control information transmitted from the base station of the neighbor cell due to a significant difference in sync error between the base station of the serving cell and the base station of the neighbor cell, and the at least one terminal cannot simultaneously generate beams in all directions but only one or a few beams at a time, determine that the cell discovery time needs to be expanded as long as a predetermined maximum sync error.

27. The base station of claim 21, wherein the controller is further configured to:
divide at least one terminal needing the cell discovery time to be expanded into a predetermined number of groups, and
transmit, to the at least one terminal, at least one of a number of a group where the at least one terminal included in the at least one terminal belongs and the number of the groups.

28. The base station of claim 27, wherein the group number is a remainder of a value obtained by dividing a unique number of the at least one terminal by the number of the groups.

29. The base station of claim 28, wherein the unique number is a mobile station ID or a radio network temporary ID.

30. The base station of claim 21, wherein the controller is further configured to:
perform scheduling on the at least one terminal so that no control information or data is transmitted during a full frame time.

31. The base station of claim 28, wherein the controller is further configured to:
perform scheduling on the at least one terminal so that no control information or data is transmitted during a time corresponding to the number or length of at least one of a predetermined maximum sync signal or sync signal and common control information.

32. A terminal for performing cell discovery in a cellular communication system, the terminal comprising:
a transceiver configured to communicate with a base station of a serving cell; and;
a controller operably connected to the transceiver and configured to:
identify whether a cell discovery time needs to be expanded;
if the cell discovery time needs to be expanded, receive group information about the cell discovery from the base station of the serving cell; and
discover a neighbor cell in a frame corresponding to a group number included in the group information, and
wherein the whether the cell discovery time needs to be expanded is determined based on at least one of a sync signal transmitted from the a station of the neighbor cell and a sync signal of the base station of the serving cell, or common control information transmitted from the base station of the neighbor cell and common control information of the base station of the serving cell,
wherein a transmission of control information or data, from the base station of the serving cell, is muted during a time expanded from the cell discovery time, based on the scheduling.

33. The terminal of claim 32, wherein the controller further configured to:
control the transceiver transmit information about a beamforming capability,
wherein the whether the cell discovery time needs to be expanded is determined based on the beamforming capability, and wherein the information about the beamforming capability includes at least one of an antenna structure of a terminal, a beamforming method, information about a total number of beams generated by the terminal, information about a number of beams simultaneously generated by the terminal, and information indicating whether the terminal may simultaneously generate beams in all directions or needs a plurality of beam switches.

34. The terminal of claim 32, wherein the controller is further configured to control the transceiver to receive at least one of the sync signal and the common control information from the base station of the serving cell, by using at least one beam.

35. The terminal of claim 32, wherein the controller is further configured to control the transceiver to receive, from the base station of the serving cell, at least one of information about a number or length of at least one of a sync signal and common control information transmitted from the base station of the serving cell, a maximum number or length of at least one of a sync signal and common control information transmitted from a base station of a neighbor cell, or information about a larger of the information about the number or length of at least one of the sync signal and common control information transmitted from the base station of the serving cell and the maximum number.

36. The terminal of claim 32, wherein the controller is further configured to:
receive information indicating whether the cell discovery time needs to be expanded from the base station of the serving cell, and
identify whether the cell discovery time needs to be expanded from the information indicating whether the cell discovery time needs to be expanded.

37. The terminal of claim 32, wherein the controller is further configured to:
if the terminal can simultaneously generate beams in all directions, determine that the cell discovery time does not need to be expanded,
if a maximum number or length of at least one of a sync signal and common control information transmitted from the base station of the neighbor cell is larger than a number or length of at least one of a sync signal and common control information transmitted from the base station of the serving cell, and the terminal cannot simultaneously generate beams in all directions but only one or few beams at a time, determine that the cell discovery time needs to be expanded to the maximum number or length of at least one of the sync signal and common control information transmitted from the base station of the neighbor cell, and
if, although the maximum number or length of at least one of the sync signal and common control information transmitted from the base station of the neighbor cell is the same or smaller than the number or length of at least one of the sync signal and common control information transmitted from the base station of the serving cell, the terminal fails to receive at least one of the sync signal and common control information transmitted from the base station of the neighbor cell due to a significant difference in sync error between the base station of the serving cell and the base station of the neighbor cell, and the terminal cannot simultaneously generate beams in all directions but only one or a few beams at a time, determine that the cell discovery time needs to be expanded as long as a predetermined maximum sync error.

38. The terminal of claim 32, wherein the group information includes at least one of a number of groups into which at least one terminal needing the cell discovery time to be expanded is divided and a number of a group where the terminal belongs.

39. The terminal of claim 38, wherein the group number is a remainder of a value obtained by dividing a unique number of the terminal by the number of the groups.

40. The terminal of claim 39, wherein the unique number is a mobile station ID or a radio network temporary ID.

* * * * *